US012724466B2

(12) United States Patent
Kim et al.

(10) Patent No.: US 12,724,466 B2
(45) Date of Patent: Sep. 1, 2026

(54) HINGE MODULE AND ELECTRONIC DEVICE COMPRISING SAME

(71) Applicant: SAMSUNG ELECTRONICS CO., LTD., Suwon-si (KR)

(72) Inventors: Jongkeun Kim, Suwon-si (KR); Myungchul Ryu, Suwon-si (KR); Giyun Lee, Suwon-si (KR); Minsung Lee, Suwon-si (KR); Iksu Jung, Suwon-si (KR); Yonghwa Han, Suwon-si (KR); Seunghyun Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 84 days.

(21) Appl. No.: 18/967,145

(22) Filed: Dec. 3, 2024

(65) Prior Publication Data

US 2025/0093918 A1 Mar. 20, 2025

Related U.S. Application Data

(63) Continuation of application No. PCT/KR2023/001536, filed on Feb. 2, 2023.

(30) Foreign Application Priority Data

Jun. 3, 2022 (KR) ........................ 10-2022-0068192
Jul. 7, 2022 (KR) ........................ 10-2022-0083547

(51) Int. Cl.
*G06F 1/16* (2006.01)
*E05D 5/14* (2006.01)

(52) U.S. Cl.
CPC ...... *G06F 1/1681* (2013.01); *E05D 2005/145* (2013.01)

(58) Field of Classification Search
None
See application file for complete search history.

(56) References Cited

U.S. PATENT DOCUMENTS 9,677,308 B1 6/2017 Chen et al.
10,036,188 B1 * 7/2018 Yao ...................... H05K 5/0226
(Continued)

FOREIGN PATENT DOCUMENTS

CN 112911033 A 6/2021
EP 4123417 A1 * 1/2023 ............. G09F 9/301
(Continued)

OTHER PUBLICATIONS

Communication issued on Dec. 23, 2025 by Intellectual Property India in Indian Patent Application No. 202417100827.
(Continued)

*Primary Examiner* — Xanthia C Relford
(74) *Attorney, Agent, or Firm* — Sughrue Mion, PLLC

(57) ABSTRACT

An hinge module configured to pivotably couple first and second housings, includes a hinge bracket, a first rotation member coupled with the first housing and disposed on the hinge bracket pivotably or rotatably around a first folding axis, a second rotation member coupled with the second housing and disposed on the hinge bracket pivotably or rotatably around a second folding axis, a cam member on the hinge bracket to be linearly movable, and an elastic member providing elastic force to the cam member in a direction in which the first rotation member and the second rotation member are brought into close contact. The cam member is configured to press at least part of the first rotation member in a direction crossing the first folding axis or at least part of the second rotation member in a direction crossing the second folding axis based on elastic force of the elastic member.

15 Claims, 21 Drawing Sheets

(56) References Cited

U.S. PATENT DOCUMENTS

| | | | | |
|---|---|---|---|---|
| 10,480,225 | B1 * | 11/2019 | Hsu | G06F 1/1616 |
| 10,845,850 | B1 | 11/2020 | Kang et al. | |
| 11,009,919 | B2 * | 5/2021 | Hsu | F16C 11/04 |
| 11,016,541 | B2 * | 5/2021 | Lin | F16C 11/04 |
| 11,516,931 | B2 | 11/2022 | Kim et al. | |
| 2017/0315593 | A1 | 11/2017 | Liang | |
| 2020/0103935 | A1 * | 4/2020 | Hsu | G06F 1/1681 |
| 2021/0120687 | A1 * | 4/2021 | Kim | G06F 1/1652 |
| 2021/0165466 | A1 | 6/2021 | Kang et al. | |
| 2021/0243908 | A1 * | 8/2021 | Park | G06F 1/1616 |
| 2021/0365073 | A1 * | 11/2021 | Cha | G06F 1/1652 |
| 2021/0381289 | A1 * | 12/2021 | Hsu | H04M 1/022 |
| 2022/0091635 | A1 * | 3/2022 | Ou | G06F 1/1652 |
| 2022/0159109 | A1 | 5/2022 | Kang | |

FOREIGN PATENT DOCUMENTS

| | | | | |
|---|---|---|---|---|
| EP | 4 036 684 | B1 | 12/2023 | |
| JP | 11-98228 | A | 4/1999 | |
| KR | 10-2001-0098442 | A | 11/2001 | |
| KR | 20-0275858 | Y1 | 5/2002 | |
| KR | 10-2011-0102022 | A | 9/2011 | |
| KR | 10-2019-0097898 | A | 8/2019 | |
| KR | 10-2020-0101229 | A | 8/2020 | |
| KR | 10-2020-0126524 | A | 11/2020 | |
| KR | 10-2021-0068880 | A | 6/2021 | |
| KR | 20220098945 | A * | 7/2022 | H04M 1/0216 |
| KR | 10-2022-0110045 | A | 8/2022 | |
| WO | 2022/039371 | A1 | 2/2022 | |

OTHER PUBLICATIONS

International Search Report (PCT/ISA/210) issued May 12, 2023 by the International Searching Authority in International Application No. PCT/KR2023/001536.

Written Opinion (PCT/ISA/237) issued May 12, 2023 by the International Searching Authority in International Application No. PCT/KR2023/001536.

Communication dated Sep. 12, 2025, issued by European Patent Office in European Patent Application No. 23703533.2.

* cited by examiner

HINGE MODULE AND ELECTRONIC DEVICE COMPRISING SAME

CROSS-REFERENCE TO RELATED APPLICATIONS

This application is a bypass continuation of International Application No. PCT/KR2023/001536, filed on Feb. 2, 2023, which claims priority to Korean Patent Application No. 10-2022-0068192, filed on Jun. 3, 2022, and Korean Patent Application No. 10-2022-0083547, filed on Jul. 7, 2022, in the Korean Intellectual Property Office, the disclosures of which are incorporated by reference herein in their entireties.

BACKGROUND

1. Field

Various embodiments of the disclosure relate to a hinge module and/or an electronic device including the same.

2. Description of Related Art

An electronic device refers to a device that performs a specific function according to an installed program, such as a home appliance, an electronic notebook, a portable multimedia player, a mobile communication terminal, a tablet PC, a video/audio device, a desktop/laptop computer, or a vehicle navigation system. For example, these electronic devices may output stored information as sound or an image. In recent years, the integration level of electronic devices has increased and ultra-high-speed, large-capacity wireless communication has become more common, so a single electronic device such as a mobile communication terminal may be equipped with an increasing number of various functions. For example, a single electronic device may be integrated with not only a communication function but also with one or more of an entertainment function such as a game, a multimedia function such as music/video playback, a communication and security function for mobile banking, a schedule management function, or an electronic wallet function.

As personal or portable communication devices such as smartphones are widely used, user demands for portability and convenience of use are increasing. For example, a touch screen display may serve as an output device that outputs, for example, visual information on a screen, and the touch screen display may also provide a virtual keypad in place of a mechanical input device (e.g., a button-type input device). As a result, portable communication devices or electronic devices may provide the same or improved usability (e.g., larger screens), while being miniaturized. On the other hand, along with the commercialization of flexible displays, for example, foldable or rollable displays, it is expected that the portability and convenience of use of electronic devices will further be improved. An electronic device including a flexible display may be carried in a folded or rolled state of a plurality of different structures (e.g., housings) and provide a large screen in an unfolded state of one or more of the plurality of different structures, thereby improving portability and convenience of use.

The above information is presented as background information only to assist with an understanding of the disclosure. No determination has been made, and no assertion is made, as to whether any of the above might be applicable as prior art with regard to the disclosure.

SUMMARY

According to an embodiment of the disclosure, an electronic device may include a first housing, a second housing configured to pivot between a position (hereinafter, a 'first position') at which the second housing is folded to face the first housing and a position (hereinafter, a 'second position) at which the second housing is unfolded at a specified angle from the first housing, a display including a first area disposed on the first housing, a second area disposed on the second housing, and a folding area disposed between the first area and the second area, and at least one hinge module disposed between the first housing and the second housing and pivotably connecting the first housing and the second housing to each other. The hinge module may include a hinge bracket, a first rotation member coupled with the first housing and disposed on the hinge bracket pivotably or rotatably around a first folding axis, a second rotation member coupled with the second housing and disposed on the hinge bracket pivotably or rotatably around a second folding axis, a cam member disposed on the hinge bracket, facing at least part of the first rotation member and the second rotation member, and an elastic member providing an elastic force to the cam member in a first action direction. The cam member may be configured to at least partially contact an inclined surface of the first rotation member or an inclined surface of the second rotation member upon receiving the elastic force of the elastic member.

According to an embodiment of the disclosure, a hinge module configured to pivotably couple a first housing and a second housing of an electronic device with each other may include a hinge bracket, a first rotation member coupled with the first housing and disposed on the hinge bracket pivotably or rotatably around a first folding axis, a second rotation member coupled with the second housing and disposed on the hinge bracket pivotably or rotatably around a second folding axis, a cam member disposed on the hinge bracket to be linearly movable, facing at least part of the first rotation member and at least part of the second rotation member, and an elastic member configured to provide an elastic force to the cam member in a direction in which the cam member is brought towards or into contact with at least one of the first rotation member and the second rotation member. Each of the first rotation member and the second rotation member may include an inclined surface contacting the cam member, and the cam member may be configured to press at least part of the first rotation member in a direction crossing the first folding axis or at least part of the second rotation member in a direction crossing the second folding axis when the elastic force of the elastic member is received by the cam member.

BRIEF DESCRIPTION OF THE DRAWINGS

The above and other aspects, configurations, and/or advantages of an embodiment of the disclosure will be more apparent from the following description taken in conjunction with the accompanying drawings.

Like reference numbers may be given to like parts, components, and/or structures throughout the accompanying drawings.

DETAILED DESCRIPTION

Figure 1:
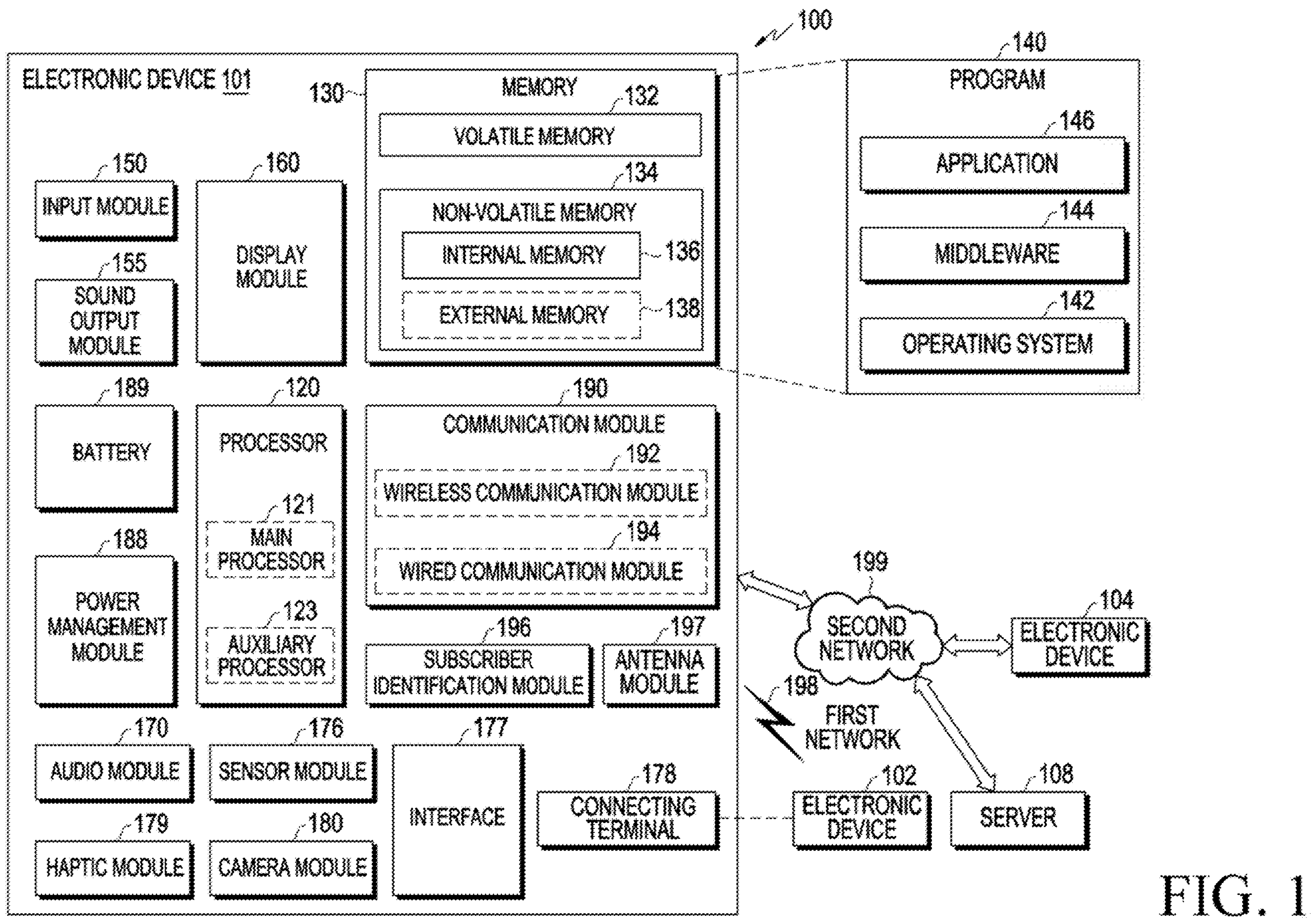
FIG. 1 is a block diagram illustrating an electronic device in a network environment according to various embodiments.

Efforts are continuously made to improve the reliability of a structure in which a plurality of different components move relative to each other, for example, an electronic device deformable between a folded state (or rolled state) and an unfolded state. For example, the durability of a display may be improved to provide stable screen quality in spite of repeated deformations, and the electronic device may include mechanical structures capable of making a deformation (folding or unfolding) operation smooth and/or stably maintaining a stationary state after the folding or unfolding operation. However, manufacturing tolerances given to mechanical components or wear caused by repeated deformation operations may bring about unintended and unwanted relative displacement or movement between the various mechanical components which are not part of an intended deformation operation. Unintended relative displacement or movement in the design or manufacture of the electronic device may reduce user satisfaction in terms of the reliability or perceived quality of a product, even though the unintended displacement or movement may not have a substantial effect on the operation of the electronic device.

An embodiment of the disclosure, which is intended to at least address the above problems and/or shortcomings and at least provide the following advantages, may provide a hinge module that provides a stable coupling structure even against manufacturing tolerances or repeated deformation operations and/or an electronic device including the same.

An embodiment of the disclosure may provide a hinge module that improves perceived quality or user satisfaction by suppressing unintended relative displacement and/or an electronic device including the same.

Additional aspects according to various embodiments will be presented through the following detailed description and apparent in part from the description or understood from a presented implementation.

The following description of the accompanying drawings may provide an understanding of various illustrative implementations of the disclosure including the claims and their equivalents. Although an exemplary embodiment disclosed in the following description contain various specific details to aid understanding, it is considered to be one of various exemplary embodiments. Accordingly, it is obvious to those skilled in the art that various changes and modifications can be made to various implementations described in the specification without departing from the scope and spirit of the disclosure. Further, a description of well-known functions and configurations will be avoided for clarity and conciseness.

The terms and words used in the following description and the claims may be used to clearly and consistently describe an embodiment of the disclosure, not limited to their referenced meanings. Accordingly, it will be apparent to those skilled in the art that the following description of various implementations of the disclosures is provided for purposes of explanation, not intended to limit the scope of the disclosure and its equivalent.

It should be understood that singular forms such as “a”, “an”, and “the” include plural referents, unless the context clearly dictates otherwise. Thus, for example, reference to “a component surface” may be understood to include one or more of the surfaces of a component.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mm Wave antenna module. According to an embodiment, the mmWave antenna module may include a printed circuit board, a RFIC disposed on a first surface (e.g., the bottom surface) of the printed circuit board, or adjacent to the first surface and capable of supporting a specified high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the specified high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to an embodiment may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1$^{st}$" and "2$^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, circuitry, or the like. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., internal memory or external memory) that is readable by a machine (e.g., an electronic device). For example, a processor (e.g., a processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In the following detailed description, the length direction, the width direction, and/or the thickness direction of an electronic device may be mentioned. The length direction may be defined as a 'Y-axis direction', the width direction as an 'X-axis direction', and/or the thickness direction as a 'Z-axis direction'. In some embodiments, regarding a direction in which a component is directed, 'negative/positive (−/+)' may be mentioned together with a Cartesian coordinate system illustrated in drawings. For example, a front surface of an electronic device or a housing may be defined as a 'surface facing in a +Z direction', and a rear surface thereof may be defined as a 'surface facing in a −Z direction'. In some embodiments, a side of the electronic device or the housing may include an area facing in a +X direction, an area facing in a +Y direction, an area facing in a −X direction, and/or an area facing in the −Y direction. In another embodiment, the 'X-axis direction' may mean including both the '−X direction' and the '+X direction'. This is based on the Cartesian coordinate system illustrated in the drawings, for brevity of description, and it is to be noted that the description of these directions or components does not limit an embodiment of the disclosure. For example, the afore-mentioned direction in which the front or rear surface is directed may vary depending on an unfolded or folded state of the electronic device, and the afore-mentioned directions may be interpreted differently depending on a user's grabbing habit.

Figure 2:
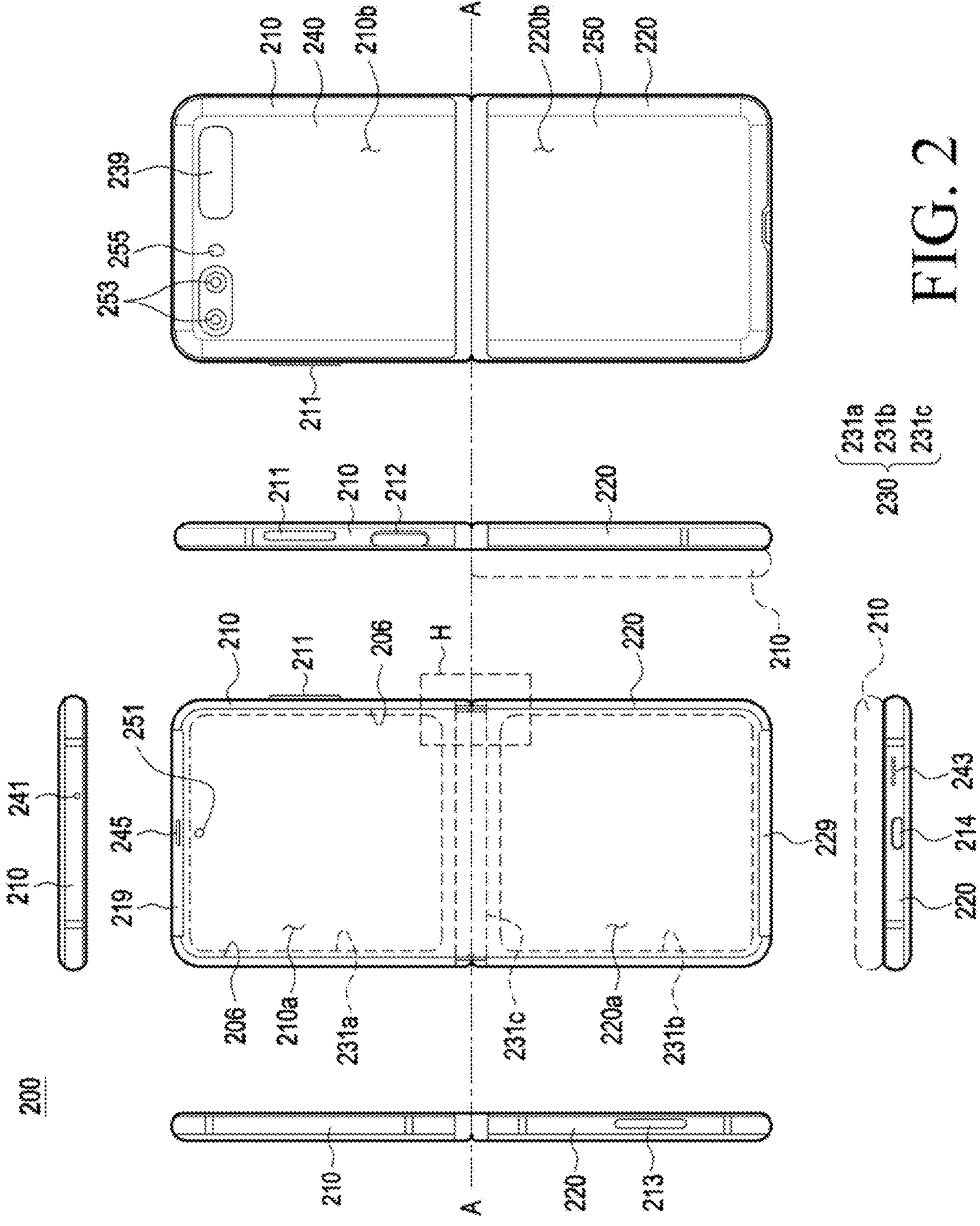
FIG. 2 is a diagram illustrating an electronic device in an unfolded state according to an embodiment of the disclosure.

FIG. 2 is a diagram illustrating an electronic device 200 in an unfolded state according to an embodiment of the disclosure.

Referring to FIG. 2, the electronic device 200 according to an embodiment may include a first housing 210, a second housing 220, and a flexible or foldable display 230 (hereinafter, referred to shortly as a "display 230") (e.g., the display module 160 of FIG. 1) disposed in a space provided by the first housing 210 and the second housing 220.

According to an embodiment, a surface on which the display 230 is disposed may be defined as a front surface (e.g., a first surface 210*a*) of the electronic device 200. The front surface of the electronic device 200 may be formed by a front plate (e.g., a glass plate or polymer plate including various coating layers) which is at least partially substantially transparent. An opposite surface to the front surface may be defined as a rear surface (e.g., a second surface 210*b*) of the electronic device 200. The rear surface of the electronic device 200 may be formed by a rear plate (hereinafter, referred to as a 'rear cover') which is substantially opaque. The rear cover may be formed of, for example, coated or tinted glass, ceramic, a polymer, a metal (e.g., aluminum, stainless steel (STS), or magnesium), or a combination of at least two of these materials. Surfaces surrounding a space between the front surface and the rear surface may be defined as side surfaces of the electronic device 200. The side surfaces may be coupled with the front plate and the rear cover and formed by a side bezel structure (or "side member") including a metal and/or a polymer. In a certain embodiment, the rear cover and the side bezel structure may be integrally formed and include the same material (e.g., a metal material such as aluminum).

The electronic device 200 may include at least one of a display 230, audio modules 241, 243, and 245, a sensor module 255, camera device(s) 251 and/or 253, key input devices 211, 212, and 213, or a connector hole 214. According to an embodiment, the electronic device 101 may not be provided with at least one (e.g., the key input devices 211, 212, and 213) of the components or additionally include other components (e.g., a light emitting element).

According to various embodiments, the display 230 may be deformable into a flat surface or a curved surface in at least a partial area thereof. According to an embodiment, the display 230 may include a folding area 231*c*, a first area 231*a* disposed on one side of the folding area 231*c* (e.g., above the folding area 231*c* illustrated in FIG. 2), and a second area 231*b* disposed on the other side of the folding area 231*c* (e.g., under the folding area 231*c* illustrated in FIG. 2). The first area 231*a* may be an area disposed in, for example, the first housing 210, and the second area 231*b* may be an area disposed in, for example, the second housing 220. However, the area division of the display 230 illustrated in FIG. 2 is exemplary, and a plurality of (e.g., two or four or more) areas may be defined according to the structure or function of the display 230. For example, although the display 230 may be divided into areas by the folding area 231*c* or a folding axis A in the embodiment illustrated in FIG. 2, the display 230 may be divided into areas with respect to another folding area 231*c* or another folding axis (e.g., an axis perpendicular to the folding axis A) in another embodiment.

According to various embodiments, the audio modules 241, 243, and 245 may include a microphone hole 241 and speaker holes 243 and 245. A microphone for obtaining external sound may be disposed inside the microphone hole 241. In a certain embodiment, a plurality of microphones may be disposed to detect the direction of sound. The speaker holes 243 and 245 may include an external speaker hole 243 and a receiver hole 245 for calls. In a certain embodiment, the speaker holes 243 and 245 and the microphone hole 241 may be implemented as a single hole, or a speaker (e.g., a piezo speaker) may be included without the speaker holes 243 and 245. The positions and number of the microphone hole 241 and the speaker holes 243 and 245 may vary according to embodiments.

According to various embodiments, the camera device(s) 251 or/and 253 may include a first camera device 251 disposed on the first surface 210*a* of the first housing 210 and a second camera device 253 disposed on the second surface 210*b*. The electronic device 200 may include a flash (not shown). The camera devices 251 and 253 may include one or more lenses, an image sensor, and/or an image signal processor. The flash (not shown) may include, for example, a light emitting diode (LED) or a xenon lamp.

According to various embodiments, the sensor module 255 may generate an electrical signal or data value corresponding to an internal operation state or external environmental state of the electronic device 200. While not shown, the electronic device 200 may include, additionally or alternatively, a sensor module (e.g., the sensor module 176) other than the sensor module 255 provided on the second surface 210*b* of the first housing 210. The electronic device 200 may include, as the sensor module, at least one of, for example, a proximity sensor, a fingerprint sensor, a heart rate monitor (HRM) sensor, a gesture sensor, a gyro sensor, a barometric pressure sensor, a magnetic sensor, an acceleration sensor, a grip sensor, a color sensor, an IR sensor, a biometric sensor, a temperature sensor, a humidity sensor, or an illuminance sensor.

According to an embodiment, the key input devices 211, 212, and 213 may be arranged on side surfaces of a foldable housing (e.g., the first housing 210 or the second housing 220). In another embodiment, the electronic device 200 may not include some or any of the above key input devices 211, 212, and 213, and the key input devices which are not included may be implemented in other forms such as soft keys on the display 230. In a certain embodiment, the key input devices may be configured to implement a key input by a sensor module (e.g., a gesture sensor).

According to various embodiments, the connector hole 214 may be configured to accommodate a connector (e.g., a universal serial bus (USB) connector) for transmitting and receiving power and/or data to and from an external electronic device, or a connector for transmitting and receiving an audio signal to and from an external electronic device.

According to various embodiments, the foldable housing may be implemented by coupling the first housing 210, the second housing 220, a first rear cover 240, a second rear cover 250, and a hinge structure (e.g., a hinge structure 340 or 400 of FIG. 3 or 4 to be described later). The foldable housing of the electronic device 200 may be implemented in other shapes or by combinations and/or coupling of components, not limited to the shape and coupling illustrated in FIG. 2. For example, in another embodiment, the first housing 210 and the first rear cover 240 may be integrally formed, and the second housing 220 and the second rear cover 250 may be integrally formed. According to an embodiment of the disclosure, the term 'housing' may mean a combination and/or coupled configuration of various other unmentioned components. For example, the first area 213*a* of the display 230 may be described as forming one surface of the first housing 210. In another embodiment, the first area 213*a* of the display 230 may be described as disposed or attached on one surface of the first housing 210.

According to various embodiments, the first housing 210 may be connected to the hinge structure (e.g., the hinge structure 340 or 400 of FIG. 3 or 4 to be described later) and include the first surface 210*a* facing in a first direction and the second surface 210*b* facing in a second direction opposite to the first direction. The second housing 220 may be connected to the hinge structure (e.g., the hinge structure 340 or 400 of FIG. 3 or 4 to be described later), include a third surface 220*a* facing in a third direction and a fourth surface 220*b* facing in a fourth direction opposite to the third surface, and rotate or pivot with respect to the first housing 210 around the hinge structure (or the folding axis A).

According to various embodiments, the first housing 210 and the second housing 220 may be disposed on both sides of (or above/under) the folding axis A, and generally symmetrical with respect to the folding axis A. An angle or distance between the first housing 210 and the second housing 220 may differ depending on whether the electronic device 200 is in an unfolded state, a folded state, or an intermediate status (e.g., a partially unfolded or a partially folded state). According to an embodiment, although the first housing 210 additionally includes various sensors unlike the second housing 220, the first housing 210 and the second housing 220 may be mutually symmetrical in the other areas.

According to various embodiments, at least part of the first housing 210 and the second housing 220 may be formed of a metal material or a non-metal material having a selected rigidity to support the display 230. The at least part formed of the metal material may be provided as a ground plane or a radiating conductor of the electronic device 200, and when provided as a ground plane, may be electrically connected to a ground line formed on a PCB (e.g., a PCB 331 of FIG. 3).

According to various embodiments, the first rear cover 240 may be disposed on one side (e.g., above in FIG. 2) of the folding axis A on the rear surface of the electronic device 200 and have, for example, a substantially rectangular periphery. The periphery may be surrounded by the first housing 210 (and/or the side bezel structure). Similarly, the second rear cover 250 may be disposed on the other side of (e.g., under in FIG. 2) the folding axis A on the rear surface of the electronic device 200, and have a periphery surrounded by the second housing 220 (and/or the side bezel structure).

According to various embodiments, the first rear cover 240 and the second rear cover 250 may be substantially symmetrical with respect to the folding axis A. However, the first rear cover 240 and the second rear cover 250 are not necessarily symmetrical in shape, and in another embodiment, the electronic device 200 may include the first rear cover 240 and the second rear cover 250 in various shapes. In another embodiment, the first rear cover 240 may be integrally formed with the first housing 210, and the second rear cover 250 may be integrally formed with the second housing 220.

According to various embodiments, the first rear cover 240, the second rear cover 250, the first housing 210, and the second housing 220 may form a space in which various components (e.g., PCBs 331 and 332 or batteries 333 and 334 of FIG. 3) may be disposed. According to an embodiment, one or more components may be disposed or visually exposed on the rear surface of the electronic device 200. For example, at least part of a sub-display 239 may be visually exposed through the first rear cover 240. In another embodiment, one or more components or sensors may be visually exposed through the first rear cover 240. In various embodiments, the components or sensors may include a proximity sensor, a rear camera, and/or a flash. In addition, although not separately shown in the drawings, one or more components or sensors may be visually exposed through the second rear cover 250.

According to various embodiments, the front camera 251 exposed from the front surface of the electronic device 200 through one or more openings or the rear camera 253 exposed through the first rear cover 240 may include one or more lenses, an image sensor, and/or an image signal processor. The flash (not shown) may include, for example, an LED or a xenon lamp. In a certain embodiment, two or more lenses (e.g., an IR camera, a wide-angle lens, and a telephoto lens) and image sensors may be disposed on one surface of the electronic device 200.

According to various embodiments, the electronic device 200 may switch to the folded state or the unfolded state. For example, the first housing 210 and the second housing 220 may mutually pivot between a first position at which they face each other and a second position (e.g., the state illustrated in FIG. 2) at which they are unfolded at a specified angle from the first position. In FIG. 2, the first housing 210 indicated by a dotted line is an example in the folded state of the electronic device 200. At the first position (e.g., the folded state), the first housing 210 and the second housing 220 may be disposed to at least partially face each other, the first area 231*a* and the second area 231*b* of the display 230 may be positioned to face each other, and the folding area 231*c* may be deformed into a curved surface. FIG. 2 illustrates an example in which the first housing 210 and the second housing 220 are unfolded to form an angle of approximately 180 degrees. According to an embodiment, the 'unfolded state' may refer to a state in which the first housing 210 and the second housing 220 are pivoted or moved at a specified angle from the folded state. In the unfolded state at the specified angle (e.g., approximately 180 degrees), the first housing 210 and the second housing 220 may be positioned side by side each on one side of the other housing, and the display 230 may be in the shape of a substantially flat plate.

According to various embodiments, the electronic device 200 may be implemented in two manners, 'in-folding' in which the first area 231*a* and the second area 231*b* are folded to face each other, and 'out-folding' in which the first area 231*a* and the second area 231*b* are folded to face in opposite directions. In the case of in-folding, for example, the first area 231*a* and the second area 231*b* may be substantially concealed in the folded state and face in substantially the same direction in a fully unfolded state. In the case of out-folding, for example, the first area 231*a* and the second area 231*b* may be disposed to face in opposite directions and exposed to the outside in the folded state and disposed to face in substantially the same direction in the fully unfolded state.

According to various embodiments, the display 230 may include a display panel and a window member and be formed of a flexible material. While not separately shown, those skilled in the art will easily understand that the display 230 or the display panel includes various layers such as a light emitting layer, substrate(s) encapsulating the light emitting layer, an electrode or wiring layer, and/or adhesive layer(s) bonding adjacent different layers. According to an embodiment, the window member, for example, a thin film plate may serve as a protection film to protect the display panel. The thin film plate as a protection film may use a material that protects the display panel from an external impact, is resistant to scratches, and reduces wrinkles in the folding area 231*c* even in repeated folding and unfolding operations of the housings 210 and 220. This window member may include clear polyimide (CPI) or ultra thin glass (UTG).

According to various embodiments, the electronic device 200 may further include protection member(s) 206 or decorative cover(s) 219 or/and 229 disposed on at least part of the periphery of the display 230 on the front surface (e.g., the first surface 210*a* or the third surface 220*a*). The protection members 206 or the decorative covers 219 and 229 may prevent the at least part of the periphery of the display 230 from contacting a mechanical structure (e.g., the first housing 210 or the second housing 220) and provide a decorative effect on the exterior of the electronic device 200. In a certain embodiment, a low-density elastic material such as sponge closely adhered to the display 230 may be provided at an edge of the folding area 231*c*, for example, at a point indicated by 'H' to at least partially block the introduction of a foreign material into the electronic device 200, while allowing deformation of the folding area 231*c*.

Figure 3:
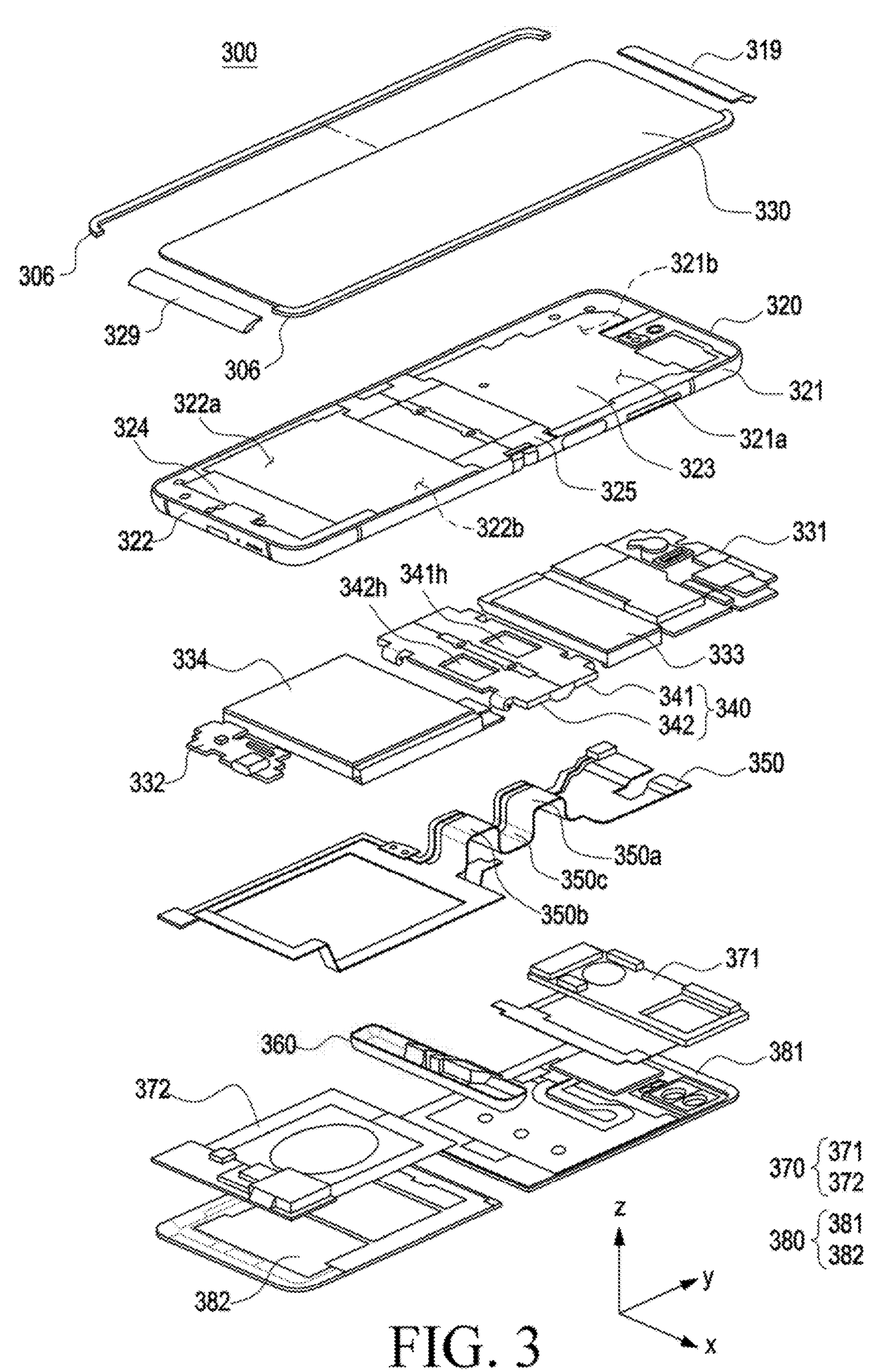
FIG. 3 is an exploded perspective view illustrating an electronic device according to an embodiment of the disclosure.

FIG. 3 is an exploded perspective view illustrating an electronic device 300 (e.g., the electronic device 200 of FIG. 2) according to an embodiment of the disclosure.

Referring to FIG. 3, in various embodiments, the electronic device 300 may include a display 330 (e.g., the display 230 of FIG. 2), a foldable housing (e.g., a first housing 321 and a second housing 322, or the housing(s) 210 or/and 220 of FIG. 2), the PCBs 331 and 332, a hinge structure 340, a flexible connection member 350, a hinge cover 360, an antenna module 370, and a rear cover 380 (e.g., the rear cover(s) 240 or/and 250 of FIG. 2). In an embodiment, the electronic device 300 may include at least one protection member 306 and/or at least one decorative cover 319 and 329. The protection members 306 and/or the decorative covers 319 and 329 may be disposed adjacent to at least part of the periphery of the display 330 (e.g., the display 230 of FIG. 2).

According to various embodiments, the display 330 may be exposed through a significant portion of a front surface of the electronic device 300. In a certain embodiment, the display 330 may be formed in a shape substantially identical to that of the outer periphery of the front surface of the electronic device 300.

According to various embodiments, the foldable housing of the electronic device 300 may include the first housing 321 (e.g., the first housing 210 of FIG. 2) and the second housing 322 (e.g., the second housing 220 of FIG. 2). According to an embodiment, the first housing 321 may include a first surface 321*a* (e.g., the first surface 210*a* of FIG. 2) and a second surface 321*b* (e.g., the second surface 210*b* of FIG. 2) facing in an opposite direction to the first surface 321*a*, and the second housing 322 may include a third surface 322*a* (e.g., the third surface 220*a* of FIG. 2) and a fourth surface 322*b* (e.g., the fourth surface 220*b* of FIG. 2) facing in an opposite direction to the third surface 322*a*. The electronic device 300 or the foldable housing 321 and 322 may additionally or alternatively include a bracket assembly 325. The bracket assembly 325 may include a first bracket assembly 323 disposed in the first housing 321 and a second bracket assembly 324 disposed in the second housing 322. At least part of the bracket assembly 325, for example, at least part of the first bracket assembly 323 and at least part of the second bracket assembly 324 may serve as a plate to support the hinge structure 340.

According to various embodiments, various electrical elements may be disposed on the PCBs 331 and 332. For example, a processor (e.g., the processor 120 of FIG. 1), memory (e.g., the memory 130 of FIG. 1), and/or an interface (e.g., the interface 177 of FIG. 1) may be mounted on the PCBs 331 and 332. The processor may include, for example, at least one of a CPU, an AP, a GPU, an image signal processor, a sensor hub processor, or a CP. The memory may include, for example, volatile memory or non-volatile memory. The interface may include, for example, a HDMI, a USB interface, an SD card interface, and/or an audio interface. The interface may electrically or physically connect the electronic device 300 to an external electronic device and include a USB connector, an SD card/multimedia card (MMC) connector, or an audio connector.

According to various embodiments, the PCBs 331 and 332 may include a first PCB 331 disposed on the side of the first bracket assembly 323, and a second PCB 332 disposed on the side of the second bracket assembly 324. The first PCB 331 and the second PCB 332 may be disposed in a space formed by the foldable housing 321 and 322, the bracket assembly 325, a first rear cover 381 (e.g., the first rear cover 240 of FIG. 2), and/or a second rear cover 382 (e.g., the second rear cover 250 of FIG. 2). Components for implementing various functions of the electronic device 300 may be separately disposed on the first PCB 331 and the second PCB 332. For example, the processor (e.g., the processor 120 of FIG. 1) may be disposed on the first PCB 331, and an audio interface (e.g., the interface 177 of FIG. 1) may be disposed on the second PCB 332.

According to various embodiments, the batteries 333 and 334 (e.g., the battery 189 of FIG. 1) may be disposed adjacent to the PCBs 331 and 332 to supply power to the electronic device 300. At least some of the batteries 333 and 334 may be disposed on substantially the same plane as, for example, the PCBs 331 and 332. According to an embodiment, a first battery 333 may be disposed adjacent to a first PCB 331, and a second battery 334 may be disposed adjacent to a second PCB 332. The batteries 333 and 334, which are devices to supply power to at least one component of the electronic device 300, may include, for example, a non-rechargeable primary battery, a rechargeable secondary battery, or a fuel cell. The batteries 333 and 334 may be built into the foldable housing 321 and 322 or detachably from the foldable housing 321 and 322.

According to various embodiments, the hinge structure 340 may be a component that provides at least one folding axis (e.g., the folding axis A of FIG. 2 or folding axes A1 and A2 of FIGS. 5 and 6) and connects or couples the foldable housing 321 and 322 and/or the bracket assembly 325 rotatably. The hinge structure 340 may include a first hinge structure 341 disposed on the side of the first PCB 331 and a second hinge structure 342 disposed on the side of the second PCB 332. The hinge structure 340 may be disposed between the first PCB 331 and the second PCB 332. In an embodiment, as the first hinge structure 341 is coupled with the first bracket assembly 323, and the second hinge structure 342 is coupled with the second bracket assembly 324, the hinge structure 340 may be disposed between the first PCB 331 and the second PCB 332. According to an embodiment, the hinge structure 340 may be substantially integrated with at least part of the first bracket assembly 323 and at least part of the second bracket assembly 324.

According to various embodiments, a 'housing structure' may include the foldable housing 321 and 322 and refer to an assembly and/or combination of at least one component disposed inside the foldable housing 321 and 322. The housing structure may include a first housing structure and a second housing structure. For example, an assembly including at least one of the first housing 321, the first bracket assembly 323 disposed inside the first housing 321, the first PCB 331, or the first battery 333 may be referred to as the 'first housing structure'. In another example, an assembly including at least one of the second housing 322, the second bracket assembly 324 disposed inside the second housing 322, the second PCB 332, or the second battery 334 may be referred to as the 'second housing structure'. However, it should be noted that 'the first housing structure and the second housing structure' may additionally include various other components or may not be provided with some components, not limited to the addition of the above-described components.

According to various embodiments, the flexible connection member 350 may be, for example, a flexible printed circuit board (FPCB). The flexible connection member 350 may connect various electrical elements disposed on the first PCB 331 and the second PCB 332. To this end, the flexible connection member 350 may be disposed to cross the 'first housing structure' and the 'second housing structure'. According to an embodiment, the flexible connection member 350 may be disposed to cross at least part of the hinge structure 340. According to an embodiment, the flexible connection member 350 may be configured to connect the first PCB 331 and the second PCB 332 across the hinge structure 340, for example, along a direction parallel to the y axis of FIG. 3. In another example, the flexible connection member 350 may extend or be disposed through openings 341*h* and 342*h* formed in the hinge structure 340. Herein, one part (e.g., a first part 350*a*) of the flexible connection member 350 may be disposed to span one side of (e.g., above) the first hinge structure 341, and another part (e.g., a second part 350*b*) of the flexible connection member 350 may be disposed to span one side of (e.g., above) the second hinge structure 342. Still another part (e.g., a third part 350*c*) of the flexible connection member 350 may be disposed on the other sides of (under) the first hinge structure 341 and the second hinge structure 342. A space (hereinafter, referred to as a 'wiring space') surrounded by at least part of the first hinge structure 341, at least part of the second hinge structure 342, and at least part of the hinge cover 360 may be formed at a position adjacent to the first hinge structure 341 and the second hinge structure 342. According to an embodiment, at least part (e.g., the third portion 350*c*) of the flexible connection member 350 may be disposed within the wiring space.

According to various embodiments, the hinge cover 360 may be configured to accommodate or surround at least part of the hinge structure 340 or the wiring space. In a certain embodiment, the hinge cover 360 may form the wiring space together with the hinge structure 340 and protect a component (e.g., at least the part 350*c* of the flexible connection member 350) disposed in the wiring space from an external impact. According to an embodiment, the hinge cover 360 may be disposed between the first housing 321 and the second housing 322. In the in-folding electronic device 300, the hinge cover 360 may be at least partially concealed by the foldable housing 321 and 322. For example, the hinge cover 360 may be visually exposed to an external space between a rear surface (e.g., the first rear cover 381) of the first housing 321 and a rear surface (e.g., the second rear cover 382) of the second housing 322 in the folded state, and substantially accommodated inside the first housing 321 or the second housing 322 to be visually concealed in the unfolded state.

According to various embodiments, the antenna module 370 (e.g., the antenna module 197 of FIG. 1) may be disposed between the rear cover 380 and the batteries 333 and 334. For example, the antenna module 370 may include a first antenna module 371 disposed at least partially between the first battery 333 and the first rear cover 381 on the side of the first housing 321, and a second antenna module 372 disposed at least partially between the second battery 334 and the second rear cover 382 on the side of the second housing 322. The antenna module 370 may include, for example, a near field communication (NFC) antenna, a wireless charging antenna, and/or a magnetic secure transmission (MST) antenna to perform short-range communication with an external device or to wirelessly transmit and receive power required for charging to and from an external device. In another embodiment, an antenna structure may be formed by part or a combination of the side bezel structure and/or the bracket assembly of the foldable housing 321 and 322.

According to various embodiments, the rear cover 380 may include the first rear cover 381 and the second rear cover 382. The rear cover 380 may be coupled with the foldable housing 321 and 322 to protect the above-described components (e.g., the PCBs 331 and 332, the batteries 333 and 334, the flexible connection member 350, and the antenna module 370) disposed in the foldable housing 321 and 322. For example, the rear cover 380 may be substantially integrally formed with the foldable housing 321 and 322.

According to various embodiments, the protection members 306 and/or the decorative covers 319 and 329 (e.g., the protection members 206 and/or the decorative covers 219 and 229 of FIG. 2) may protect at least part of the periphery of the display 330. In an embodiment, the protection members 306 may be disposed between the periphery of the display 330 and an inner wall of the first housing 321 and/or between the periphery of the display 330 and an inner wall of the second housing 322 to prevent the periphery of the display 330 from directly contacting the inner walls of the foldable housing 321 and 322. According to an embodiment, the protection members 306 may contact the second housing 322 (e.g., the second housing 220 of FIG. 2) earlier than the display 330 (e.g., the first area 231*a* of FIG. 2) and/or contact the first housing 321 earlier than the second area 231*b* of the display 330 in the folded state to protect the display 330. In an embodiment, the protection members 306 may prevent direct contact between the first area 231*a* and the second area 231*b* of the display 330 in the folded state. In another embodiment, the decorative cover 319 may be disposed in at least one of the first housing 321 or the second housing 322 and disposed to cover part of the periphery of the display 330.

The structure of a hinge structure or a hinge module will be described below in detail. In describing the structure of the hinge structure or the hinge module, reference may be made to the configurations of the electronic devices 200 and 300 of FIGS. 2 and 3.

Figure 4:
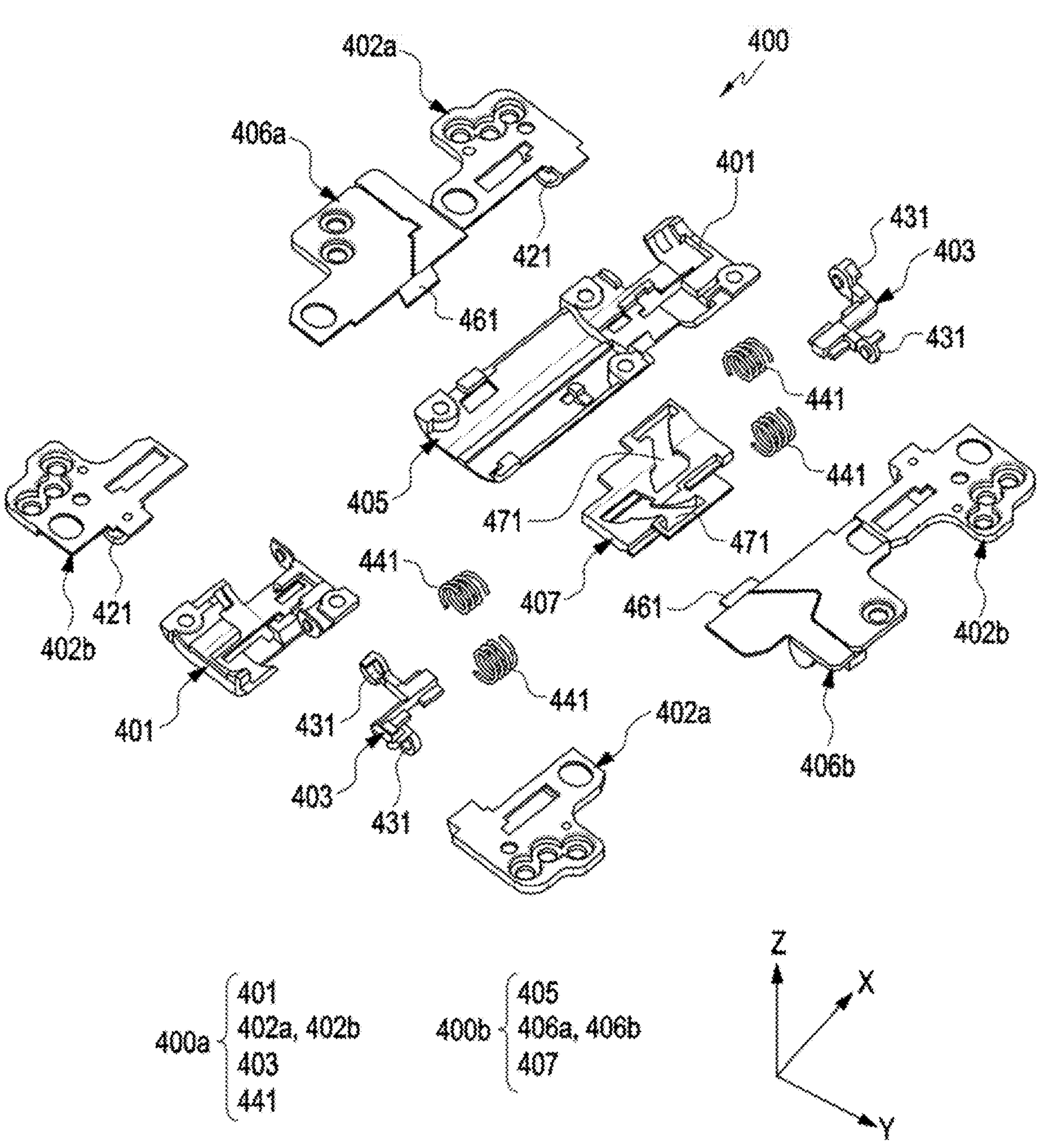
FIG. 4 is an exploded perspective view illustrating a hinge structure according to an embodiment of the disclosure.
Figure 5:
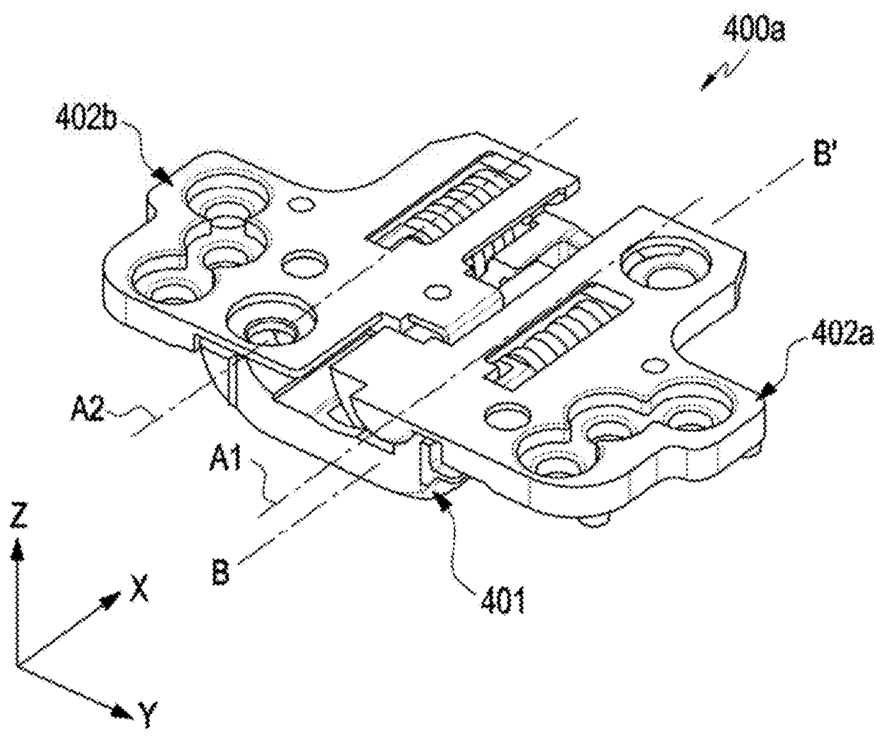
FIG. 5 is a perspective view illustrating a hinge module in an unfolded state according to an embodiment of the disclosure.
Figure 6:
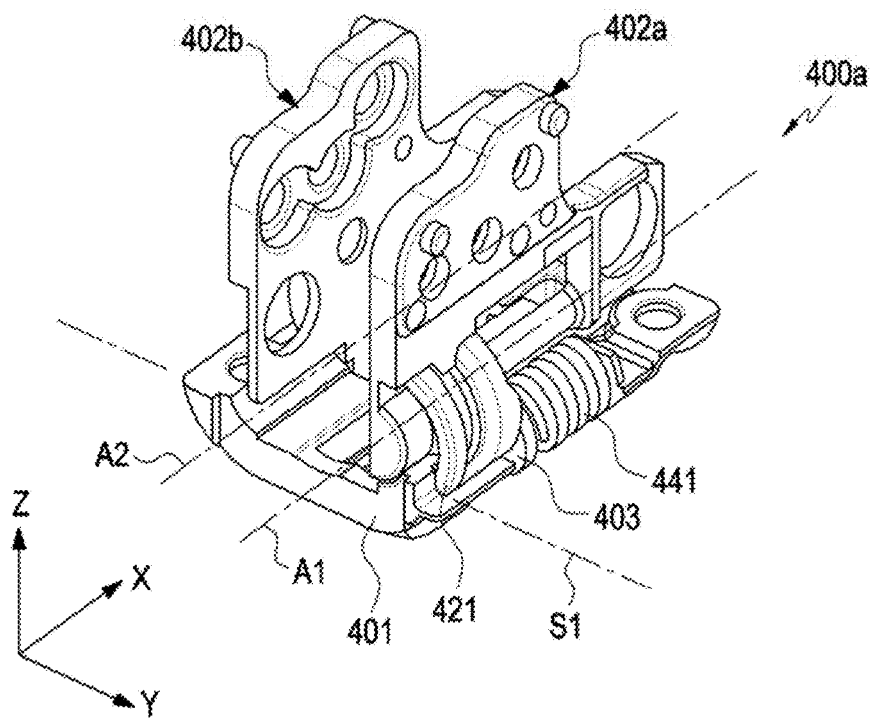
FIG. 6 is a perspective view illustrating a hinge module in a folded state according to an embodiment of the disclosure.
Figure 7:
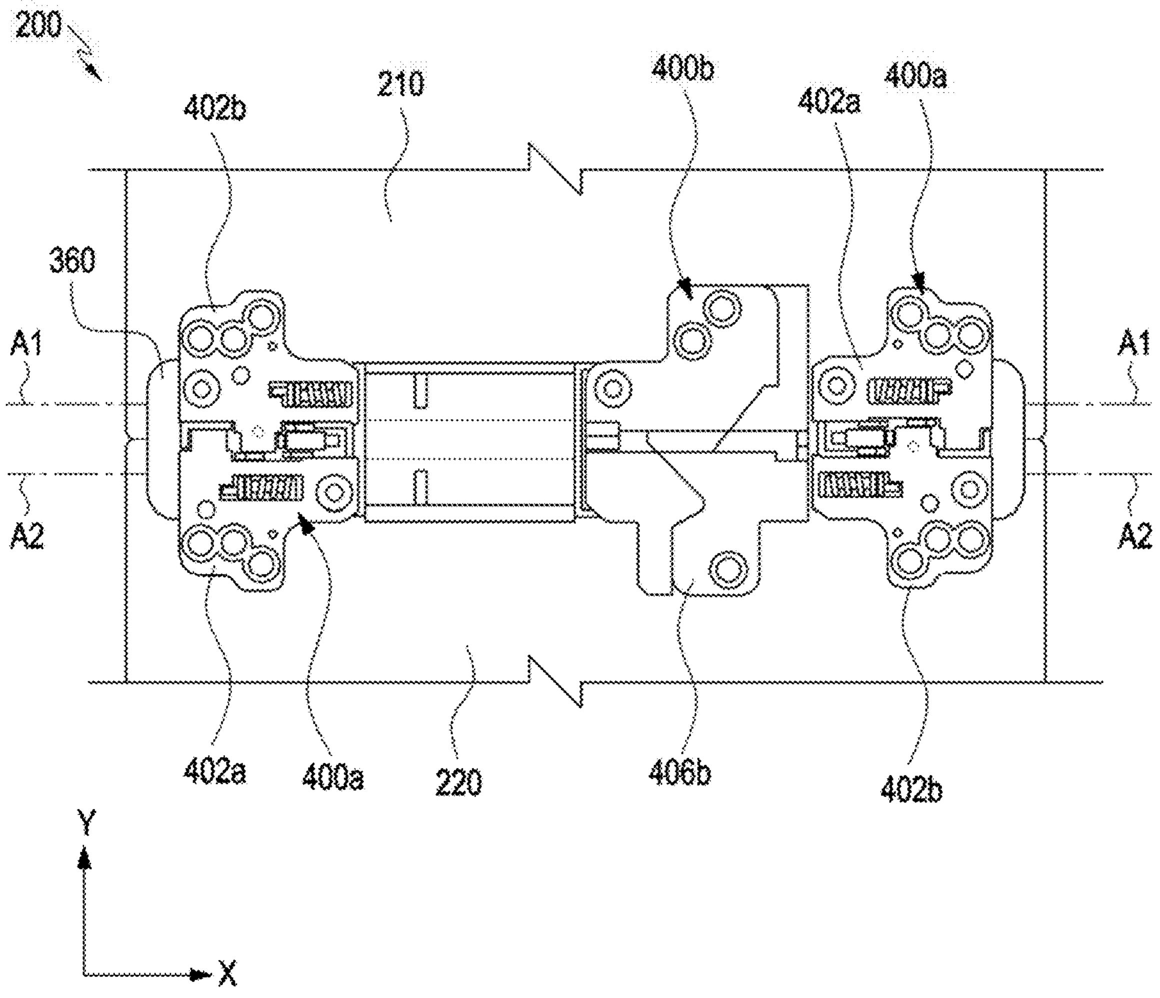
FIG. 7 is a diagram illustrating arrangement of the hinge structure of FIG. 4 according to an embodiment of the disclosure.

FIG. 4 is an exploded perspective view illustrating the hinge structure 400 (e.g., the hinge structure 340 of FIG. 3) according to an embodiment of the disclosure. FIG. 5 is a perspective view illustrating a hinge module 400*a* in an unfolded state according to an embodiment of the disclosure. FIG. 6 is a perspective view illustrating the hinge module 400*a* in a folded state according to an embodiment of the disclosure. FIG. 7 is a diagram illustrating arrangement of the hinge structure 400 of FIG. 4 according to an embodiment of the disclosure.

Referring to FIGS. 4 to 7, the hinge structure 400 (e.g., the hinge structure 340 of FIG. 3) may include hinge module(s) 400*a* and an interlocking hinge module 400*b*. The hinge structure 400 may rotatably or pivotably couple the first housing 210 or 321 with the second housing 220 or 322. According to an embodiment, the hinge module(s) 400*a* and/or the interlocking hinge module 400*b* may be disposed on an inner surface of a hinge cover (e.g., the hinge cover 360 of FIG. 3) to be substantially concealed from an external environment. In the illustrated embodiment, a pair of hinge modules 400*a* may be disposed in correspondence with both ends of a folding area (e.g., the folding area 231*c* of FIG. 2) in the direction of the folding axis A of FIG. 2 (e.g., the X-axis direction), and at least one interlocking hinge module 400*b* may be disposed between the pair of hinge modules 400*a*. According to an embodiment, any one of the hinge modules 400*a* may be omitted, or an additional hinge module or an additional interlocking hinge module may be further disposed. In an embodiment, the hinge module 400*a* may provide a pair of folding axes A1 and A2, and the folding axes A1 and A2 may be disposed parallel to each other at a specified interval. According to an embodiment, the distance between the folding axes A1 and A2 may determine the radius of curvature of the folding area 231*c* in the folded state. For example, the folding axes A1 and A2 may be disposed at a specified interval so that the folding area 231*c* may have an appropriate radius of curvature even in the folded state.

According to an embodiment, the hinge module 400*a* may include a hinge bracket 401, rotation members 402*a* and 402*b*, a cam member 403, and/or an elastic member 441. The configuration of the hinge module 400*a* will be described with reference to FIGS. 4 to 7, and various embodiments of a more specific shape or structure of the hinge bracket 401, the rotation members 402*a* and 402*b*, and/or the cam member 403 will be described with reference to FIGS. 8 to 16. According to an embodiment, the hinge bracket 401 may be fastened or fixed to an inner surface of the hinge cover 360 and include guide curved surfaces (e.g., guide curved surfaces 411 of FIG. 8). In some embodiments, the hinge bracket 401 may be provided integrally with the hinge cover 360, and the guide curved surfaces (e.g., the guide curved surfaces 411 of FIG. 8) may guide, for example, rotation or pivoting of the rotation members 402*a* and 402*b*, while surrounding the rotation members 402*a* and 402*b*. The rotation members 402*a* and 402*b* may be part of the hinge module 400*a* and coupled with the different first housing 210 or 321 and second housing 220 or 322, respectively. In an embodiment, the rotation members 402*a* and 402*b* may include a rotation body 421 disposed on one surface thereof, and the rotation body 421 may be disposed surrounded by one of the guide curved surfaces 411. For example, the rotation members 402*a* and 402*b* or the rotation body 421 may rotate around one of the folding axes A1 and A2 under the guidance of the guide curved surface 411. For example, the rotation body 421 may include an arc-shaped outer circumferential surface, and the outer circumferential surface of the rotation body 421 may be disposed to slidingly contact the guide curved surface 411. In an embodiment, the outer circumferential surface of the rotation body 421 may be substantially a curved surface of an arc trajectory centering on any one of the folding axes A1 and A2. In an embodiment, the hinge bracket 401 may include first guide protrusion(s) (e.g., first guide protrusion(s) 413 of FIG. 8) disposed at a specified distance from the guide curved surface 411, and a first guide groove (e.g., a first guide groove 421*d* of FIG. 12) shaped into an arc centering on one of the folding axes A1 and A2 may be formed on one surface of the rotation body 421. For example, the rotation members 402*a* and 402*b* may be rotatably disposed on the hinge bracket 401 with the first guide protrusion 413 accommodated in the first guide groove 421*d*. Therefore, the first guide protrusion 413 and/or the first guide groove 421*d* may guide rotation of the rotation member(s) 402*a* or/and 402*b* relative to the hinge bracket 401, while restraining the rotation member(s) 402*a* or/and 402*b* on the hinge bracket 401.

According to an embodiment, the cam member 403 may be disposed on the hinge bracket 401 to be linearly movable along the directions of the folding axis(es) A1 and A2, and disposed to face an inner wall (e.g., the first guide protrusion 413 of FIG. 8) of the hinge bracket 401 with part (e.g., the rotation body 421) of the rotation member(s) 402*a* or/and 402*b* interposed therebetween. For example, the rotation body 421 of the rotation member 402*a* or 402*b* may be disposed between any one of cams 431 of the cam member 403 and any one of the first guide protrusions 413. The cam member 403 (or the cam 431) may include a guide protrusion (e.g., a guide protrusion 431*a* of FIG. 13) similar to the first guide protrusion 413, and the rotation body 421 may include a guide groove (e.g., a guide groove 421*a* of FIG. 9) of an arc trajectory centering on one of the folding axes A1 and A2, on the other surface thereof. For example, the guide protrusion 431*a* included in the cam member 403 may be at least partially accommodated in the guide groove 421*a* of the rotation body 421, and the rotation body 421 may be rotatably constrained on the hinge bracket 401 by the first guide protrusion 413 and the guide protrusion 431*a*.

According to an embodiment, the elastic member 441 may be disposed on the hinge bracket 401 to press the cam member 403 (e.g., the cam 431) in the directions of the folding axis(es) A1 and A2. For example, the cam member 403 may receive an elastic force of the elastic member 441 (e.g., an elastic force acting in an arrowed direction BF in FIG. 15 or 21) to be brought into close contact with the rotation member(s) 402*a* or/and 402*b* (e.g., the rotation body 421), and the rotation body 421 may be brought into close contact with the inner wall of the hinge bracket 401 (e.g., the inner wall on which the first guide protrusion 413 is disposed). Although a configuration in which elastic members 441 are provided to correspond to cams 431 or rotation bodies 421 in the illustrated embodiment, by way of example, the number, shape, and/or positions of elastic members 441 may be appropriately changed according to the structure of the hinge module 400*a* as far as an elastic force may be applied to the cam member 403 along the direction of the folding axes A1 or A2.

According to an embodiment, the folding axes A1 and A2 may be substantially set by disposing the rotation members 402*a* and 402*b* on the hinge bracket 401. For example, as the first rotation member 402*a* of the rotation members 402*a* and 402*b* is disposed on the hinge bracket 401, the folding axis A1 may be set at the center of the radius of curvature of the guide curved surface 411 or the center of the radius of curvature of the guide groove 421*a*, and as the second rotation member 402*b* of the rotation members 402*a* and 402*b* is disposed on the hinge bracket 401, the second folding axis A2 may be set. According to an embodiment, the first rotation member 402*a* may be included in any one of the first hinge structure 341 and/or the second hinge structure 342 of FIG. 3, and the second rotation member 402*b* may be included in the other one of the first hinge structure 341 and/or the second hinge structure 342 of FIG. 3. For example, as the rotation members 402*a* and 402*b* have a larger size than illustrated, they may substitute for one of the hinge structures 341 and 342. In an embodiment, as the rotation members 402*a* and 402*b* have a larger size than illustrated, they may implement part of any one of the hinge structures 341 and 342.

According to an embodiment, the first rotation member 402*a* and the second rotation member 402*b* may be disposed side by side on the sides of them or face each other depending on the unfolded state or the folded state. However, this is for the example of the hinge module 400*a* of FIGS. 5 and 6. In the folded state of an actual electronic device (e.g., the electronic device 200 or 300 of FIG. 2 or 3), the first rotation member 402*a* and the second rotation member 402*b* may be disposed to face each other with the first hinge structure 341 and/or the second hinge structure 342 of FIG. 3 interposed therebetween. For example, in the actual electronic device 200 or 300, the first rotation member 402*a* and the second rotation member 402*b* may be disposed to face each other with the first hinge structure 341, the second hinge structure 342, and/or part (e.g., the folding area 231*c* of FIG. 2) of the display 330 interposed therebetween.

In an embodiment, when any one of the first housing 321 and the second housing 322 pivots relative to the hinge structure 400, the interlocking hinge module 400*b* may pivot the other one of the first housing 321 and the second housing 322. For example, pivoting of the first housing 210 or 321 and pivoting of the second housing 220 or 322 may be linked to each other by the interlocking hinge module 400*b*. According to an embodiment, the interlocking hinge module 400*b* may include a slide bracket 405 fastened or fixed to the inner surface of the hinge cover 360, a pair of third rotation members 406*a* and 406*b* pivotably or rotatably disposed on the slide bracket 405, and a slider 407 disposed to be linearly movable along the directions of the folding axis(es) A1 and A2 on the slide bracket 405. According to an embodiment, the slide bracket 405 may be provided integrally with the hinge cover 360 or may extend from the hinge bracket 401 along the directions of the folding axis(es) A1 and A2. For example, the slide bracket 405 may be formed integrally with at least one of hinge brackets 401. According to an embodiment, the slide bracket 405 may guide linear movement of the slider 407. In an embodiment, the third rotation members 406*a* and 406*b* may be coupled with the different first housing 210 or 321 and second housing 210 or 322, respectively and rotate or pivot around any one of the folding axes A1 and A2. A slide protrusion 461 may be provided at one end of the third rotation member(s) 406*a* or/and 406*b*, and as the third rotation member(s) 406*a* or/and 406*b* rotate around one of the folding axes A1 and A2, the slide protrusion 461 may move along an arc trajectory on the slide bracket 405.

According to an embodiment, the slider 407 may include a plurality of slide holes 471, each slide hole accommodating one of slide protrusions 461, and the slide holes 471 may extend in an inclined direction with respect to the folding axis(es) A1 or/and A2 and/or arc trajectories centering on the folding axis(es) A1 or/and A2. In an embodiment, as the slide protrusion 461 is slidably coupled with one of the slide holes 471, linear movement of the slider 407 and rotation of the third rotation member(s) 406*a* or/and 406*b* may be converted to each other. For example, when at least one of the third rotation members 406*a* and 406*b* rotates on the slide bracket 405, the slider 407 may move linearly on the slide bracket 405 due to the inclined trajectory of the slide hole 471. In another embodiment, when the slider 407 linearly moves on the slide bracket 405, the third rotation member(s) 406*a* or/and 406*b* may rotate on the slide bracket 405. For example, the inclined trajectories of the slide holes 471 may be set so as to rotate the third rotation members 406*a* and 406*b* in a mutually approaching or receding direction, when the slider 407 moves linearly. In an embodiment, the first housing 210 or 321 and the second housing 220 or 322 may be connected through this interlocking hinge module 400*b*, so that they pivot in opposite directions relative to each other between a folded position and an unfolded position.

Figure 8:
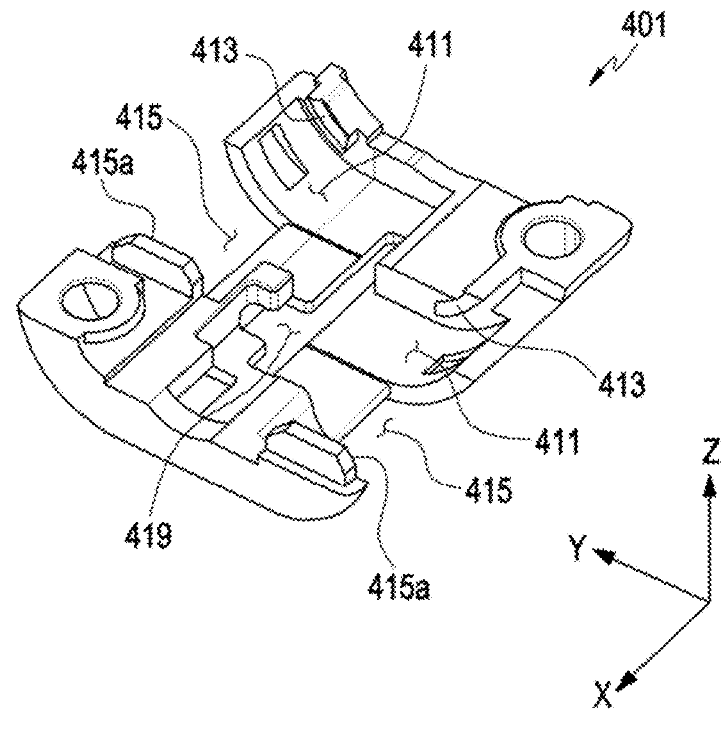
FIG. 8 is a perspective view illustrating a hinge bracket of FIG. 4 according to an embodiment of the disclosure.

FIG. 8 is a perspective view illustrating the hinge bracket 401 of FIG. 4 according to an embodiment of the disclosure.

Referring to FIG. 8, the hinge bracket 401 may include the guide curved surface(s) 411, the first guide protrusion(s) 413, and/or a guide slit 419. The guide curved surface 411, which is, for example, a curved surface in the form of an arc centering on any one of folding axes (e.g., the folding axes A1 and A2 of FIG. 5), may guide or support the rotation of the rotation members 402*a* and 402*b*. For example, when the pair of folding axes A1 and A2 are provided at positions spaced apart from each other, the hinge bracket 401 may include a pair of guide curved surfaces 411. In an embodiment, the first guide protrusion 413 may be disposed between the guide curved surface 411 and the folding axis(es) A1 or/and A2 and extend along the direction(s) of the folding axis(es) A1 or/and A2 from a position spaced apart from the guide curved surface 411. The guide slit 419 may extend between guide curved surfaces 411 along the direction(s) of the folding axis(es) A1 or/and A2 and slidably accommodate a support protrusion (e.g., a support protrusion 439 of FIG. 13) of the cam member 403, which will be described later. For example, the guide slit 419 may support or guide the linear movement of the cam member 403.

In an embodiment, the hinge bracket 401 may further include one or more accommodation hole(s) 415 disposed adjacent to the guide curved surface 411. The accommodation hole 415 may be a space in which, for example, part (e.g., the cam 431) of the cam member 403 and/or the elastic member 441 to be described later is accommodated, and may be in the form of a cut area or opening area extending inward from the periphery of the hinge bracket 401. An inner wall (hereinafter, referred to as an 'end wall 415*a*') of the hinge bracket 401, provided at one end of the accommodation hole 415 may be disposed to face the first guide protrusion 413 in the direction(s) of the folding axis(es) A1 or/and A2 and support one end of the elastic member 441. For example, part (e.g., the rotation body 421 of FIG. 4) of the rotation member 402*a* or 402*b*, part (e.g., the cam 431) of the cam member 403, and/or the elastic members 441 may be disposed substantially between the first guide protrusion 413 and the end wall 415*a*, and the elastic member 441 may provide an elastic force that brings the cam member 403, the rotation member 402*a* or 402*b*, and/or the first guide protrusion 413 into contact or close contact in the direction(s) of the folding axis(es) A1 or/and A2. In a certain embodiment, the hinge bracket 401 may include a structure that contacts the rotation member 402*a* or 402*b* (e.g., the rotation body 421) earlier than the first guide protrusion 413 in the direction of the folding axis A1 or A2. In this case, the first guide protrusion 413 may not directly contact the rotation member 402*a* or 402*b* in the direction(s) of the folding axis(es) A1 or/and A2.

Figure 9:
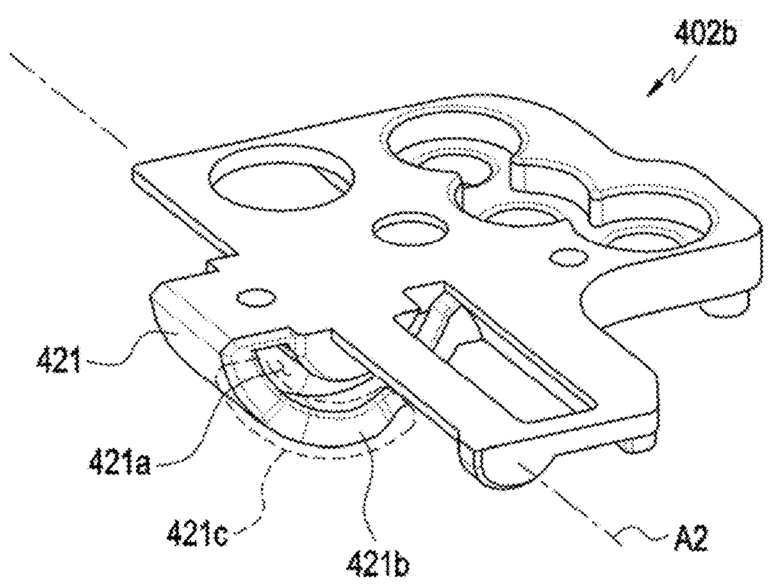
FIG. 9 is a perspective view illustrating rotation member(s) of FIG. 5 according to an embodiment of the disclosure.
Figure 10:
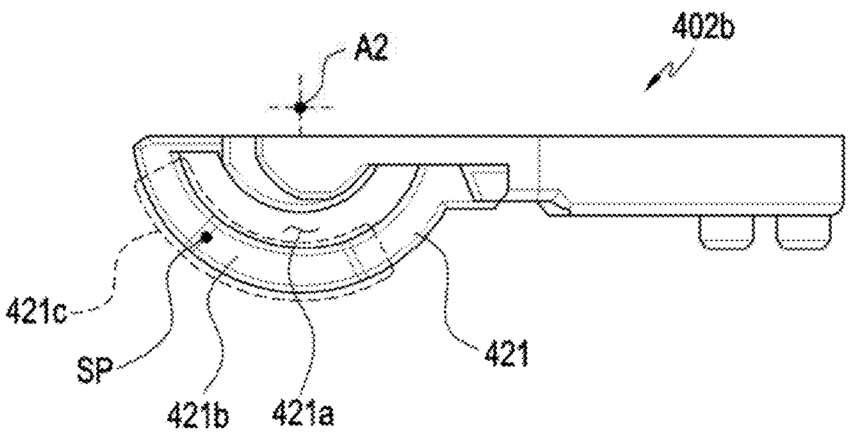
FIG. 10 is a diagram illustrating rotation member(s) of FIG. 4 viewed from a first direction according to an embodiment of the disclosure.
Figure 11:
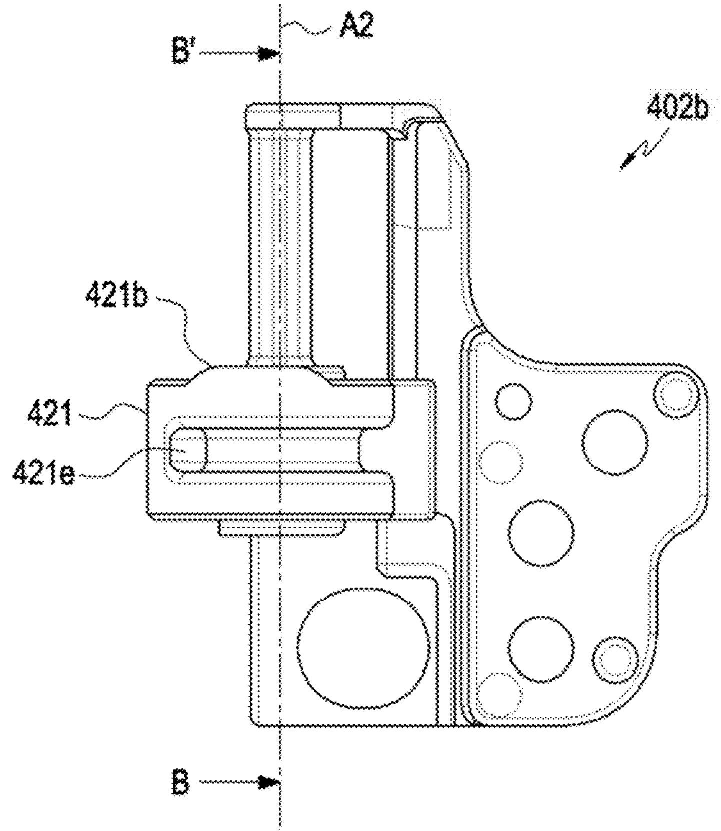
FIG. 11 is a diagram illustrating the rotation member(s) of FIG. 9 viewed from a second direction according to an embodiment of the disclosure.
Figures 12, 13:
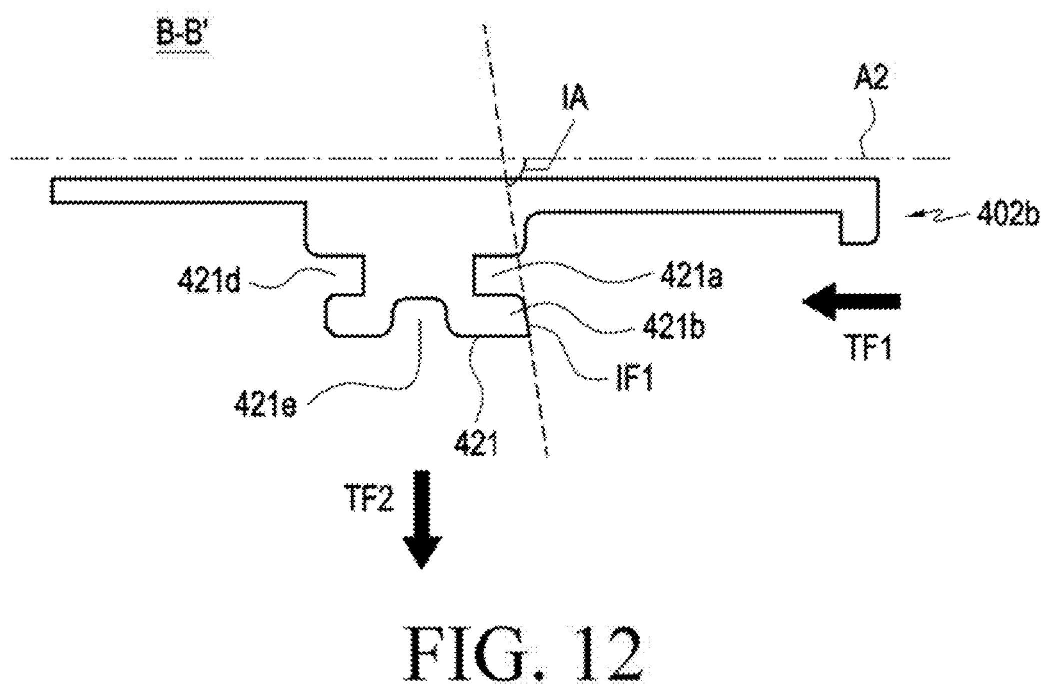
FIG. 12 is a diagram illustrating a rotation member cut along a line B-B' of FIG. 11 according to an embodiment of the disclosure.
FIG. 13 is a perspective view illustrating cam member(s) of FIG. 4 according to an embodiment of the disclosure.

FIG. 9 is a perspective view illustrating the rotation member(s) 402*a* or/and 402*b* (e.g., the second rotation member(s) 402*b* of FIG. 5) according to an embodiment of the disclosure. FIG. 10 is a diagram illustrating the rotation member(s) 402*a* or/and 402*b* of FIG. 4 viewed from a first direction (e.g., a direction parallel to the folding axis A1 or A2) according to an embodiment of the disclosure. FIG. 11 is a diagram illustrating the rotation member(s) 402*a* or/and 402*b* of FIG. 9 viewed from a second direction (e.g., a direction perpendicular to the folding axis A1 or A2) according to an embodiment of the disclosure. FIG. 12 is a diagram illustrating the rotation member 402*a* or 402*b* cut along a line B-B' of FIG. 11 according to an embodiment of the disclosure.

According to an embodiment, the first rotation member 402*a* may be similar to or substantially the same as the second rotation member 402*b* except a slight difference between the positions of the rotation bodies 421. Therefore, the second rotation member 402*b* of the rotation members 402*a* and 402*b* is illustrated and described in FIGS. 9 to 12, by way of example, and those skilled in the art will easily understand the first rotation member 402*a* from the description of the second rotation member 402*b*.

Referring to FIGS. 9 to 12, the second rotation member 402*b* may be shaped into a flat plate on the whole and include the rotation body 421 formed on one surface thereof. The rotation body 421 may be substantially semi-circular cylindrical in shape, and include an outer circumferential surface in the form of an arc or curved surface centering on any one (e.g., the second folding axis A2) of the folding axes A1 and A2. In an embodiment, the rotation body 421 may include the guide groove 421*a* and a contract area 421*c* which are formed on a surface facing the cam 431 in the direction of the second folding axis A2. The guide groove 421*a* may extend along an arc trajectory centering on, for example, the second folding axis A2, and the contact area 421*c* may have an arc trajectory centering on the second folding axis A2 and extending along the periphery of the guide groove 421*a*. The rotation body 421 may include the first guide groove 421*d* corresponding to the first guide groove 413, on the surface opposite to the surface on which the guide groove 421*a* is formed, and the shape of the first guide groove 421*d* may be substantially the same as that of the guide groove 421*a*.

According to an embodiment, the contact area 421*c* may be understood as a trajectory in which the cam member 403 (e.g., the cam 431 of FIG. 4) slidingly contacts, when the second rotation member 402*b* rotates around the second folding axis A2. In a certain embodiment, the second rotation member 402*b* may rotate at approximately 90 degrees on the hinge bracket 401, and as each of the first rotation member 402*a* and the second rotation member 402*b* rotates on the hinge bracket 401, the foldable housing 321 and 322 may be deformed between the folded state and the unfolded state. In a certain embodiment, the contact area 421*c* may be formed in an arc trajectory of approximately 90 degrees or greater and approximately 130 degrees or less. For example, a pressing protrusion (e.g., a pressing protrusion 431*b* of FIG. 13) of the cam member 403 may slidingly contact the contact area 421*c*, and the angle of the arc trajectory of the contact area 421*c* may be set according to an angular range in which the pressing protrusion 431*b* extends in a circumferential direction. The angular range of the contact area 421*c* may be set in various ways according to the design of angular ranges in which the rotation members 402*a* and 402*b* rotate with respect to the cam member 403, and may be equal to or greater than about 90 degrees and equal to or less than about 100 degrees in an actual product.

According to an embodiment, the rotation member(s) 402*a* or/and 402*b* (e.g., the second rotation member 402*b*) may further include a detent protrusion protruding from the contact area 421*c* in the direction(s) of the folding axis(es) A1 or/and A2. When viewed along the direction(s) of the folding axis(es) A1 or/and A2, the detent protrusion 421*b* may extend, for example, in an arc trajectory of a smaller angular range than the contact area 421*c*, and contact the pressing protrusion 431*b* of the cam member 403 at a specified position. For example, when the pressing protrusion 431*b* contacts the detent protrusion 421*b* at a point indicated by 'SP' in FIG. 10, the elastic force of the elastic member 441 may be converted into a driving force that rotates the second rotation member 402*b* in a counterclockwise direction. According to an embodiment, the first housing 210 or 321 and the second housing 220 or 322 may be at least partially in contact with each other in the folded state, and in a structure in which the second rotation member 402*b* is coupled with the second housing 220 or 322, the second rotation member 402*b* may no longer rotate in a direction in which an angle with the first rotation member 402*a* is decreased or in a direction in which an angle between the first housing 210 or 321 and the second housing 220 or 322 is decreased (e.g., the counterclockwise direction in the illustrated state of FIG. 10). For example, as the pressing protrusion 431*b* contacts one end (e.g., the point indicated by 'SP') of the detent protrusion 421*b* in the folded state, a contact state between the first housing 210 or 321 and the second housing 220 or 322 and/or the folded state of the electronic device 200 or 300 may be stably maintained.

According to an embodiment, the second rotation member 402*b* and/or the cam member 403 may convert the elastic force of the elastic member 441 so that the contact area 421*c* may act in a direction crossing the folding axis(es) A1 or/and A2. For example, although the elastic force of the elastic member 441 acts in parallel with the folding axis(es) A1 or/and A2 and thus in a direction in which the cam member 403 (e.g., the cam 431) is brought into contact with the second rotation member 402*b* (e.g., in an arrowed direction 'TF1' in FIG. 12), the elastic force may be converted or distributed in a direction in which the rotation member 402*a* or 402*b* (e.g., the second rotation member 402*b*) is rotated by the structures of the rotation member(s) 402 or/and 402*b* and the cam member 403 (e.g., refer to FIG. 10 and the description of the preceding paragraph made with reference to FIG. 10) and/or a direction in which the contact area 421*c* recedes from the folding axis(es) A1 or/and A2 (e.g., an arrowed direction 'TF2' in FIG. 12). Although reference is made to the direction receding from the folding axis(es) A1 or/and A2 regarding the "direction crossing the folding axis(es) A1 or/and A2" in an embodiment, it is to be noted that embodiments of the disclosure are not limited thereto. For example, the inclination directions of inclined surfaces IF1 and IF2 illustrated in an embodiment for which reference is made to FIG. 21 may vary, and part of the elastic force of the elastic member 441 may be converted in a direction that brings the rotation member(s) 402*a* or/and 402*b* closer to the folding axis(es) A1 or/and A2.

According to an embodiment, the second rotation member 402*b* may further include a main inclined surface IF1 formed around the guide groove 421*a* on one surface of the rotation body 421. The main inclined surface IF1 may be at least part of the surface of the detent protrusion 421*b*, and the entire contact area 421*c* may be provided as the main inclined surface IF1 according to an embodiment. In an embodiment, the main inclined surface IF1 may be formed to be inclined at a specified angle IA in a direction approaching the cam member 403 or the elastic member 441 as it moves away from the folding axis(es) A1 or/and A2 in the radial direction of the arc trajectory. For example, at least part of the cam member 403 may be disposed between the folding axis(es) A1 or/and A2 and the main inclined surface IF1, and when the cam member 403 contacts the main inclined surface IF1 or the contact area 421*c*, at least part of the elastic force of the elastic member 441 may be converted in a direction that moves the contact area 421*c* (e.g., the main inclined surface IF1) away from the folding axis(es) A1 or/and A2 (e.g., the arrowed direction 'TF2' in FIG. 12).

According to an embodiment, the second rotation member 402*b* may further include a dummy groove 421*e* extending in a circumferential direction from the outer circumferential surface of the rotation body 421. Although not shown, the electronic device 200 or 300 or the hinge module 400*a* may further include a dummy protrusion formed on the hinge cover 360 or the hinge bracket 401, and as the dummy protrusion is accommodated in the dummy groove 421*e*, the dummy protrusion may be used as a structure that guides or supports the rotation of the second rotation member 402*b*, together with the dummy groove 421*e*.

According to an embodiment, although the first rotation member 402*a* is different from the second rotation member 402*b* in terms of the position of the rotation body 421 in the direction(s) of the folding axis(es) A1 or/and A2, the configuration of the first rotation member 402*a* is similar to or substantially the same as that of the second rotation member 402*b*. Even though the 'second rotation member 402*b*' is exemplified in the drawings referred to in the detailed description, it may be referred to as the 'rotation member(s) 402*a* or/and 402*b*', and the configuration of the first rotation member 402*a* may be understood from the detail description of the second rotation member 402*b*. In the following detailed description, it is to be noted that ordinal numbers such as 'first' or 'second' may be used when it is necessary to distinguish similar components provided to each of the first rotation member 402*a* and the second rotation member 402*b*, and the same reference numerals as in the drawings may be used together.

Figure 14:
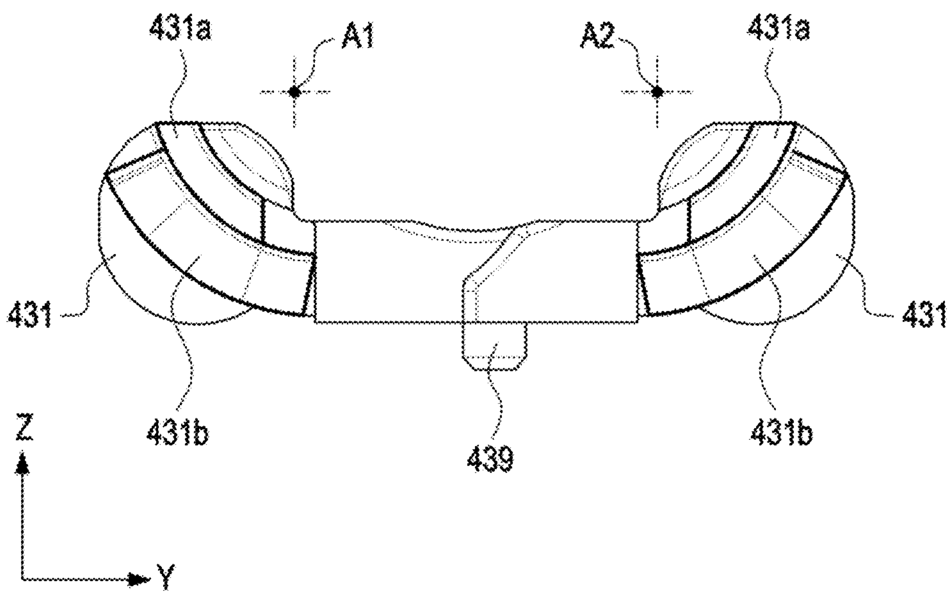
FIG. 14 is a diagram illustrating the cam member(s) of FIG. 4 viewed from the first direction according to an embodiment of the disclosure.
Figure 15:
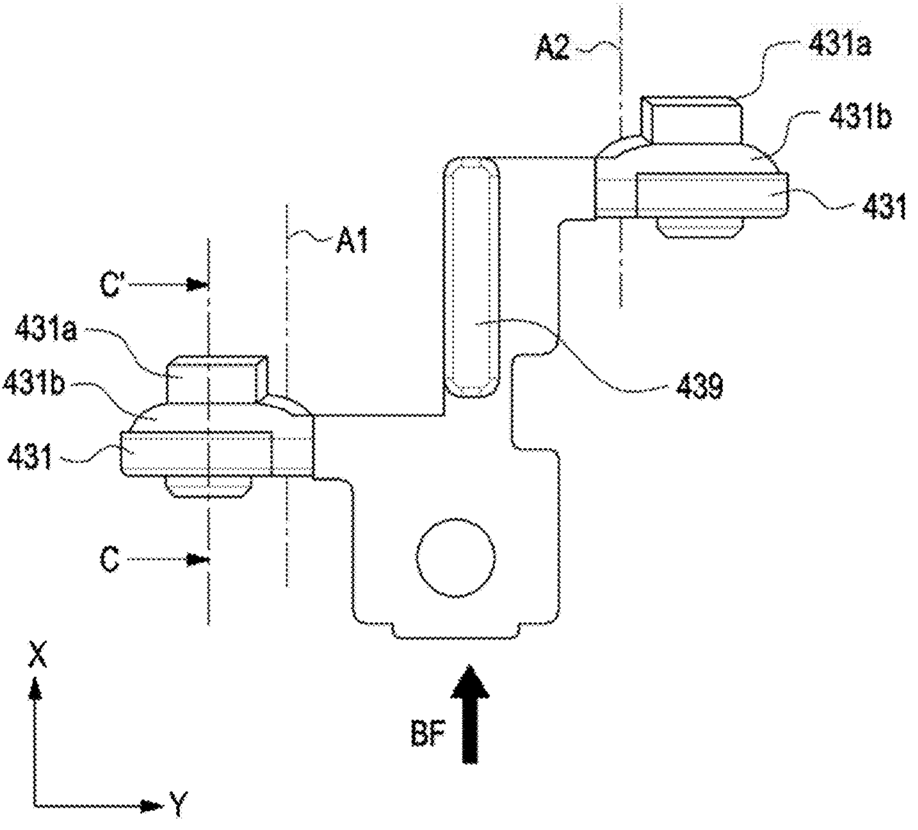
FIG. 15 is a diagram illustrating the cam member(s) of FIG. 4 viewed from the second direction according to an embodiment of the disclosure.
Figure 16:
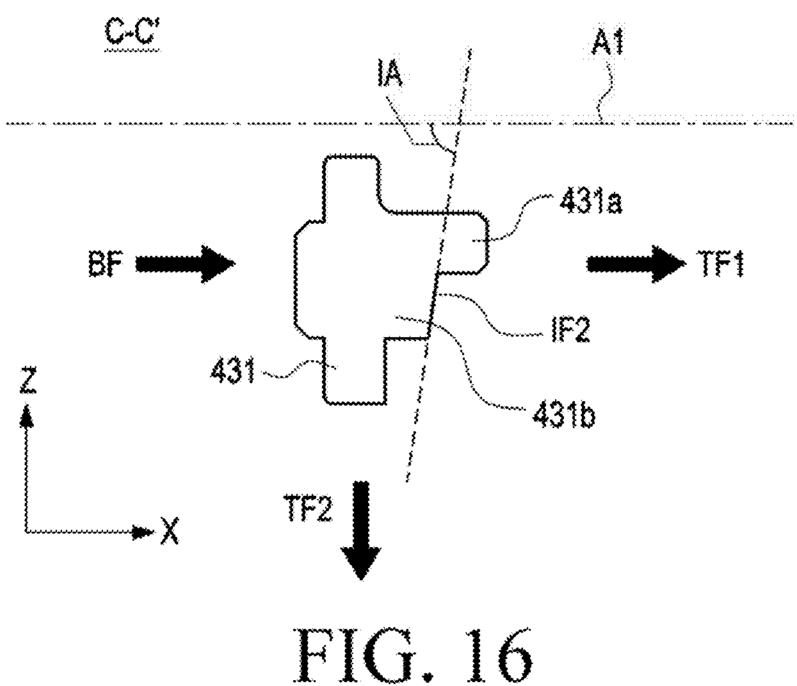
FIG. 16 is a diagram illustrating a cam member cut along a line C-C' of FIG. 15 according to an embodiment of the disclosure.

FIG. 13 is a perspective view illustrating the cam member(s) 403 of FIG. 4 according to an embodiment of the disclosure. FIG. 14 is a diagram illustrating the cam member(s) 403 of FIG. 4 viewed from a first direction according to an embodiment of the disclosure. FIG. 15 is a diagram illustrating the cam member(s) 403 of FIG. 4 viewed from a second direction according to an embodiment of the disclosure. FIG. 16 is a diagram illustrating the cam member 403 cut along a line C-C' of FIG. 15 according to an embodiment of the disclosure.

Referring to FIGS. 13 to 16, the cam member 403 may include a pair of cams 431 configured to contact to the rotation members 402*a* and 402*b* (e.g., the rotation bodies 421 of FIG. 9) and a support protrusion 439 corresponding to the hinge bracket 401 (e.g., the guide slit 419 of FIG. 8). The support protrusion 439 may extend in the direction(s) of the folding axis(es) A1 or/and A2 and be disposed at least partially in the guide slit 419. For example, the cam member 403 may be disposed to be linearly movable in the direction(s) of the folding axis(es) A1 or/and A2 on the hinge bracket 401 under the guidance of the support protrusion 439. The cams 431 may be disposed at positions spaced apart from each other on the cam member 403 and disposed to face any one of the rotation members 402*a* and 402*b*. For example, the cams 431 may be disposed to face substantially any one of the rotation bodies 421 and at least partially come into contact or close contact with any one of the rotation bodies 421 by the elastic force of the elastic member 441. In some embodiments, the cams 431 may be disposed to face part of the arc trajectory of the guide groove 421*a* or the contact area 421*c* and slidingly contact the contact area 421*c* according to rotation of the rotation member(s) 402*a* or/and 402*b*.

According to an embodiment, the hinge module 400*a* and/or the cam member 403 may include at least one guide protrusion 431*a* and at least one pressing protrusion 431*b* formed on the cam(s) 431 on a surface facing the rotation body(s) 421. The guide protrusion 431*a* and/or the pressing protrusion 431*b* may protrude in the direction(s) of the folding axis(es) A1 or/and A2 from one surface of the cam(s) 431, the guide protrusion 431*a* may be accommodated in the guide groove 421*a* of the rotation member 402*a* or 402*b*, and the pressing protrusion 431*b* may be disposed in correspondence with the contact area 421*c*. For example, the cam member 403 may substantially contact the contact area 421*c* through the pressing protrusion 431*b*. Since the guide protrusion 431*a* and the pressing protrusion 431*b* are disposed in correspondence with the guide groove 421*a* or the contact area 421*c*, the guide protrusion 431*a* and the pressing protrusion 431*b* may have arc trajectories centering on anyone of the folding axes A1 and A2 and extend in the circumferential direction in a smaller angular range than the guide groove 421*a* or the contact area 421*c*.

According to an embodiment, the surface facing the contact area 421*c* in the direction(s) of the folding axis(es) A1 or/and A2, for example, the surface of the pressing protrusion 431*b* may include an inclined or sub-inclined surface IF2 inclined with respect to the folding axis(es) A1 or/and A2 by the specified angle IA. The sub-inclined surface IF2 may be formed to be inclined at the specified angle IA in a direction receding from the rotation member 402*a* or 402*b* (e.g., the rotation body 421) as it moves away from the folding axis(es) A1 or/and A2 in the radial direction of the arc trajectory. In an embodiment, the rotation member 402*a* or 402*b* (e.g., the rotation body 421) may be disposed at least partially between the cam 431 (e.g., the pressing protrusion 431*b*) and the hinge bracket 401. In an embodiment, when part of the rotation member 402*a* or 402*b* is disposed between the cam 431 and the hinge bracket 401, the sub-inclined surface IF2 may be disposed substantially between the main inclined surface IF1 of the rotation member 402*a* or 402*b* (e.g., the rotation body 421) and the folding axis A1 or A2. For example, the sub-inclined surface IF2 may distribute or convert the elastic force of the elastic member 441 in the arrowed direction TF1 and/or in the arrowed direction TF2 by pressing the main inclined surface IF1. The arrowed direction TF1 may be, for example, a direction in which the cams 431 come into close contact with the rotation member 402*a* or 402*b* (e.g., the rotation body 421), and the arrowed direction TF2 may be, for example, a direction intersecting with a direction in which the elastic member 441 provides an elastic force, and may be a direction in which the main inclined surface IF1 moves away from the folding axis A1 or A2.

Figure 17:
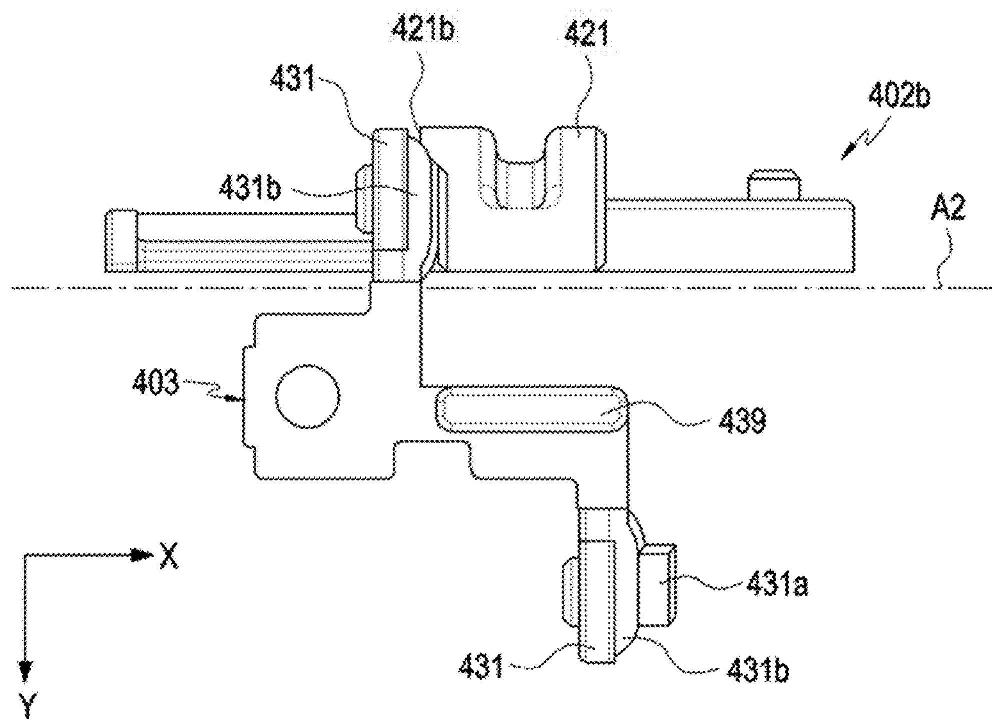
FIG. 17 is a diagram illustrating arrangement of a rotation member and a cam member in the folded state of the electronic device of FIG. 2 according to an embodiment of the disclosure.
Figure 18:
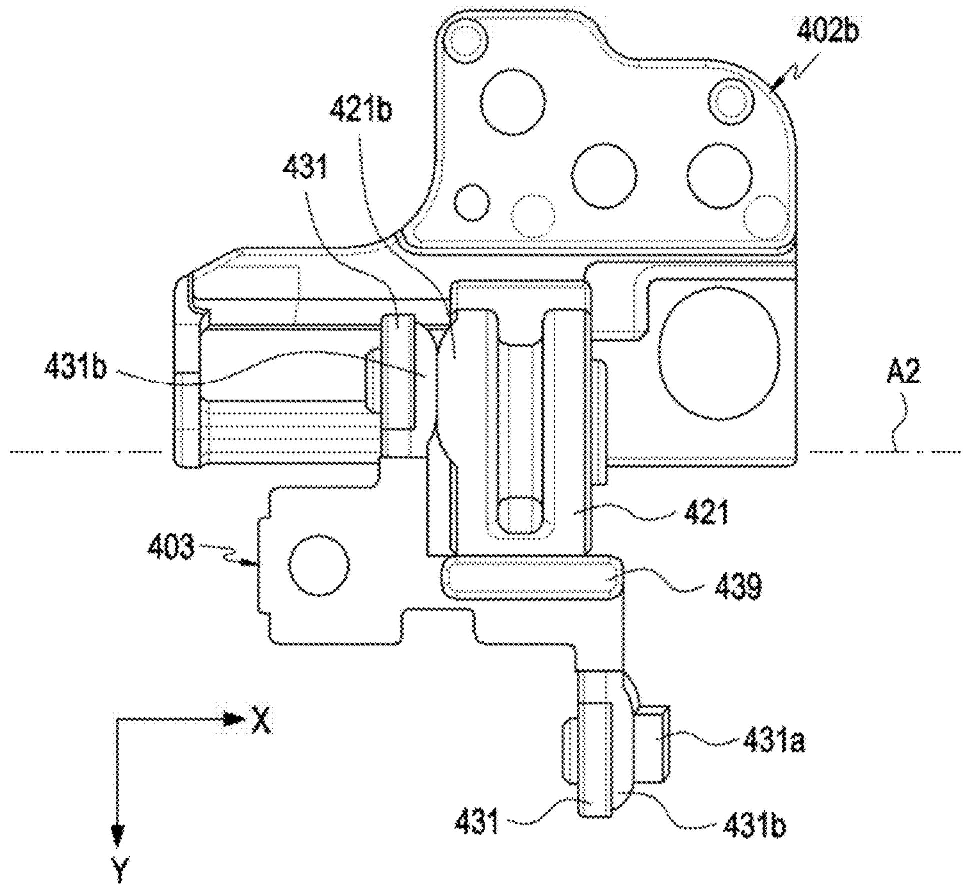
FIG. 18 is a diagram illustrating arrangement of a rotation member and a cam member in an operation of folding or unfolding the electronic device of FIG. 2 according to an embodiment of the disclosure.
Figure 19:
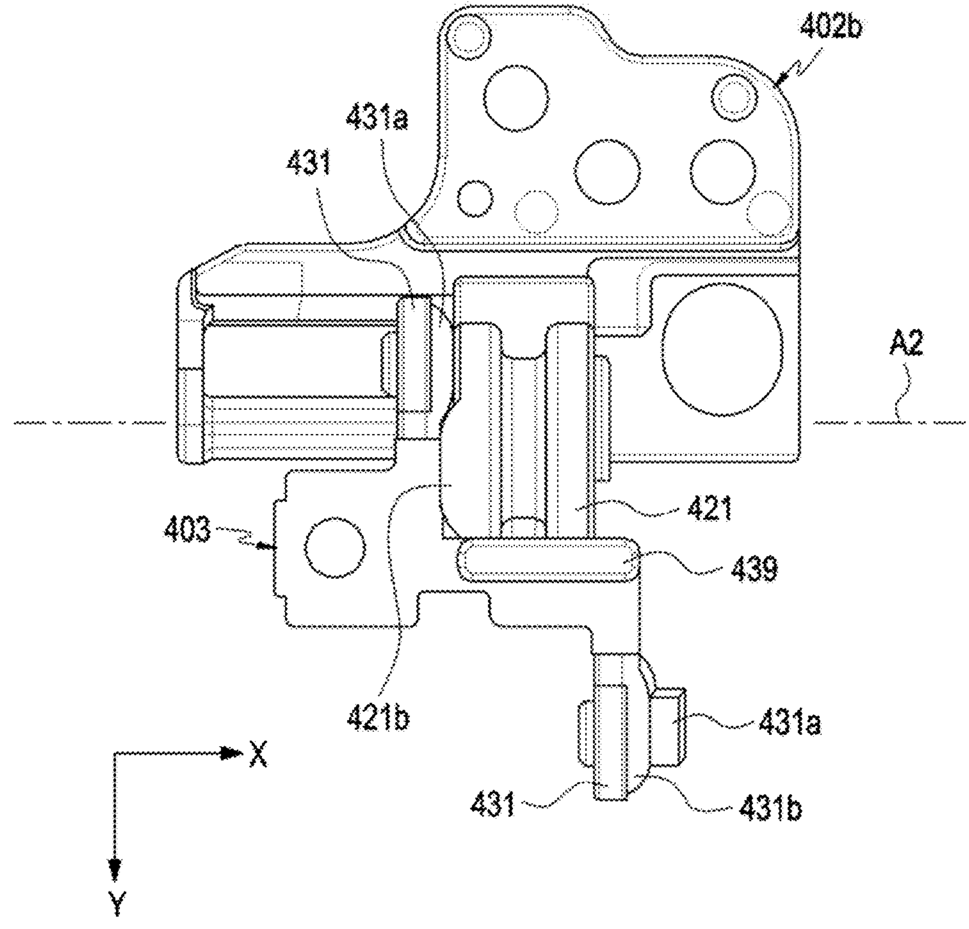
FIG. 19 is a diagram illustrating arrangement of a rotation member and a cam member in the unfolded state of the electronic device of FIG. 2 according to an embodiment of the disclosure.

FIG. 17 is a diagram illustrating arrangement of the rotation member 402*a* or 402*b* and the cam member 403 in the folded state of the electronic device 200 of FIG. 2 according to an embodiment of the disclosure. FIG. 18 is a diagram illustrating arrangement of the rotation member 402*a* or 402*b* and the cam member 403 in a folding or unfolding operation of the electronic device 200 of FIG. 2 according to an embodiment of the disclosure. FIG. 19 is a diagram illustrating arrangement of the rotation member 402*a* or 402*b* and the cam member 403 in the unfolded state of the electronic device 200 of FIG. 2 according to an embodiment of the disclosure.

Referring to FIGS. 17 to 19, when the rotation member(s) 402*a* or/and 402*b* rotate around any one of the folding axes A1 and A2 (e.g., the second folding axis A2), the cam member 403 (e.g., the pressing protrusion 431*b*) may slidingly contact one surface (e.g., the contact area 421*c* of FIG. 9 or 10) of the rotation body 421. An area that the pressing protrusion 431*b* slidingly contacts on the rotation body 421 may be substantially an arc trajectory centering on any one of the folding axes A1 and A2.

Referring to FIG. 17, when the electronic device 200 is folded, the pressing protrusion 431*b* may contact one end of the detent protrusion 421*b*, for example, the point indicated by 'SP' in FIG. 10, thus suppressing unfolding of the foldable housing 210 and 220 or 321 and 322. For example, when the user does not unfold the electronic device 200, the pressing protrusion 431*b* and the detent protrusion 421*b* may stably maintain the folded state of the electronic device 200. According to an embodiment, in the folded state, the sub-inclined surface IF2 may press the main inclined surface IF1 in a direction in which at least part of the rotation member 402*a* or 402*b*, for example, the rotation body 421 recedes from the folding axis A1 or A2. Herein, the 'at least part of the rotation body 421' may include a point where the pressing protrusion 431*b* contacts the rotation body 421. Therefore, at least part of the outer circumferential surface of the rotation body 421 may come into contact with a specified position of the hinge bracket 401 (e.g., the guide curved surface 411). In an embodiment, the point where the rotation body 421 contacts the hinge bracket 401 may be maintained at a substantially fixed position with respect to the folding axis A1 or A2, and thus displacement of the rotation body 421 with respect to another structure other than rotation around the folding axis A1 or A2 may be suppressed. Various embodiments of the contact point between the rotation body 421 and the hinge bracket 401 and/or a configuration for suppressing relative displacement of the rotation body 421 will be described in more detail with reference to FIG. 20.

Referring to FIG. 18, in an operation of gradually unfolding the foldable housing 210 and 220 or 321 and 322 from the folded state, the pressing protrusion 431*b* may on one surface of the rotation body 421, while slidingly contacting the contact area 421*c* (e.g., the detent protrusion 421*b*). In an embodiment, the main inclined surface IF1 of the detent protrusion 421*b* may be inclined with respect to the folding axis A1 or A2 by a specified angle (e.g., the angle indicated by 'IA' in FIG. 12) in the radial direction of the arc trajectory, and may be substantially a flat surface in a circumferential direction or an arcuate direction. For example, the foldable housing 210 and 220 or 321 and 322 may be unfolded at an arbitrary angle in an intermediate state between the folded state and the unfolded state. According to an embodiment, the pressing protrusion 431*b* and the detent protrusion 421*b* may maintain the foldable housing 210 and 220 or 321 and 322 in the unfolded state at the arbitrary angle in the intermediate state by providing a static frictional force. In the operation of unfolding (or folding) the foldable housing 210 and 220 or 321 and 322, the sub-inclined surface IF2 may press the main inclined surface IF1, thereby converting part of the elastic force of the elastic member 441 in the arrowed direction TF2 of FIG. 16. For example, the contact point between the rotation body 421 and the hinge bracket 401 in the unfolding operation may be substantially the same as in the folded state with respect to the folding axis A1 or A2, and displacement of the rotation member 402*a* or 402*b* or the rotation body 421 relative to another structure (e.g., the hinge bracket 401) other than the rotation around the folding axis A1 or A2 may be suppressed.

Referring to FIG. 19, the pressing protrusion 431*b* may contact the other end of the detent protrusion 421*b*, thus suppressing unfolding of the electronic device 200 in the unfolded state of the electronic device 200. For example, the pressing protrusion 431*b* may suppress folding of the foldable housing 210 and 220 or 321 and 322 by receiving the elastic force of the elastic member 441 while being in contact with the other end of the detent protrusion 421*b*. When an external force (e.g., user manipulation) greater than the elastic force of the elastic member 441 is applied, the detent protrusion 421*b* may gradually move to a folded position while retracting the pressing protrusion 431*b*. The folding operation of the foldable housing 210 and 220 or 321 and 322 may be performed substantially in the reverse direction of the unfolding operation, which may be easily understood from the embodiment for which reference is made to FIG. 18.

According to an embodiment, the cam member 403 (e.g., the pressing protrusion 431*b*) may contact the main inclined surface IF1 in the folded state of the electronic device 300. For example, at least in the folded state, relative displacement of the rotation body 421, the rotation member 402*a* or 402*b*, and/or the housings 210 and 220 or 321 and 322 may be suppressed, and suppression of unintended relative displacement may increase user satisfaction. In an embodiment, the main inclined surface IF1 may be formed in the entire trajectory or section where the contact area 421*c* extends. For example, during rotation of the foldable housing 210 and 220 or 321 and 322 between the folded state and the unfolded state, relative displacement of the rotation body 421, the rotation member 402*a* or 402*b*, and/or the housings 210 and 220 or 321 and 322 except rotation may be suppressed. In an example, the main inclined surface IF1 may be formed in part of the trajectory or section in which the contact area 421*c* extends. In this case, the relative displacement of the rotation body 421, the rotation member 402*a* or 402*b*, and/or the housings 210 and 220 or 321 and 322 may be suppressed in a section in which the cam member 403 (e.g., the pressing protrusion 431*b*) contacts the main inclined surface IF1.

Figure 20:
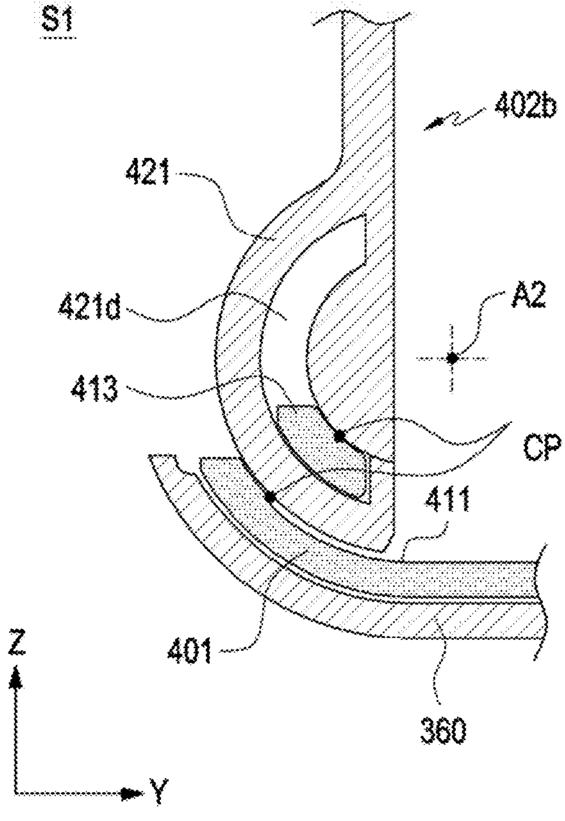
FIG. 20 is a cut-away diagram illustrating a hinge module taken along a line S1 of FIG. 6 in which a hinge bracket and a rotation member are disposed according to an embodiment of the disclosure.
Figure 21:
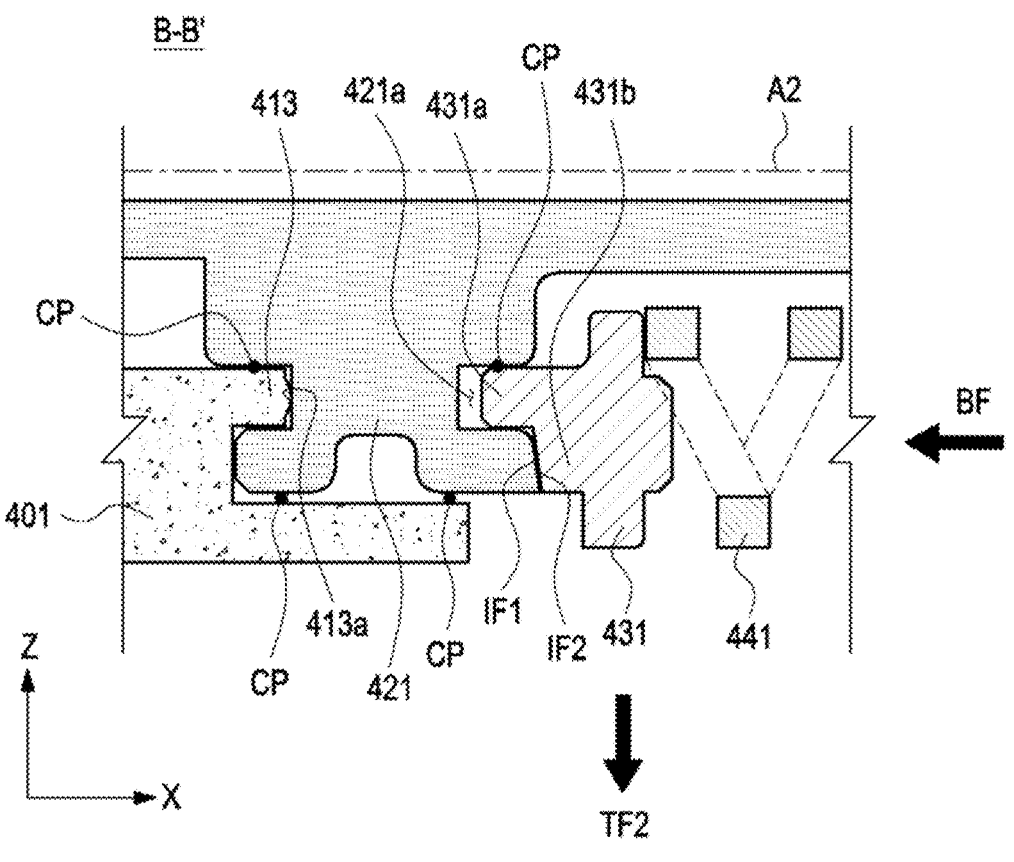
FIG. 21 is a diagram illustrating a hinge module cut along the line B-B' of FIG. 5 according to an embodiment of the disclosure.

FIG. 20 is a cut-away view of the hinge module 400*a* taken along a line S1 of FIG. 6 according to an embodiment of the disclosure, illustrating arrangement of the hinge bracket 401 and the rotation member 402*a* or 402*b*. FIG. 21 is a cut-away view of the hinge module 400*a* taken along the line B-B' of FIG. 5 according to an embodiment of the disclosure.

Referring to FIGS. 20 and 21, one surface of the rotation member 402*a* or 402*b* (e.g., the rotation body 421) may be disposed to face the cam member 403 (e.g., the cam 431), and the other surface of the rotation body 421 may be disposed to face the inner wall of the hinge bracket 401, in the direction of the folding axis A1 or A2. When the elastic force of the elastic member 441 is applied, the main inclined surface IF1 and the sub-inclined surface IF2 may convert at least part of the elastic force in the arrowed direction TF2. For example, the rotation member 402*a* or 402*b* may contact the hinge bracket 401 and/or the cam member 403 at point(s) indicated by 'CP' (hereinafter, referred to as 'contact point(s) CP') by the force applied in the arrowed direction TF2. As the part of the elastic force of the elastic member 441 is converted in the arrowed direction TF2, the contact point(s) CP may be maintained at a substantially fixed position with respect to the folding axis A1 or A2 and/or the hinge bracket 401.

According to an embodiment, a certain degree of gap may be generated between the hinge bracket 401 and the rotation member 402*a* or 402*b* and/or between the cam member 403 and the rotation member 402*a* or 402*b* due to a manufacturing tolerance allowed for the hinge bracket 401 or the rotation member 402*a* or 402*b* and/or wear caused by repeated rotations. This gap may allow displacement of the rotation member 402*a* or 402*b* relative to the folding axis A1 or A2 or another structure (e.g., the hinge bracket) other than an intended motion (e.g., rotation for folding/unfolding). An embodiment of the disclosure may suppress relative displacement of the rotation member 402*a* or 402*b* by converting the elastic force of the elastic member 441 in the arrowed direction TF2 using the inclined surface IF1 of the rotation member 402*a* or 402*b*, and thus substantially fixing the contact points CP on the hinge bracket 401 and/or with respect to the folding axis A1 or A2. For example, the user's perceived quality of the electronic device 200 or 300 may be improved by suppressing, reducing or eliminating movement of the foldable housing 210 and 220 or 321 and 322, which is not intended in design or manufacture. Furthermore, suppressing, reducing or eliminating the unintended movement of the foldable housing can increase the lifetime of the electronic device by reducing the amount of wear or damage that the electronic device receives over time.

According to an embodiment, areas (e.g., an end surface of the first guide protrusion 413 or the sub-inclined surface IF2 of the cam member 403) in which the rotation member 402*a* or 402*b* directly contacts another structure in the direction of the folding axis A1 or A2 may generate a frictional force in the folding or unfolding operation. In consideration of a smoothness of the folding operation (or unfolding operation) or a static friction force for maintaining the inclination angle (e.g., intermediate state) of the foldable housing 210 and 220 or 321 and 322, the sizes of areas contacting or facing in the direction of the folding axis A1 or A2 may be controlled. For example, when the end surface of the first guide protrusion 413 is a structure in contact with the rotation body 421, the hinge bracket 401 may further include a friction protrusion or bump 413*a* protruding or extending from the end surface of the first guide protrusion 413 in the direction of the folding axis A1 or A2. For example, when the first guide protrusion 413 is a structure in direct contact with the rotation body 421, the friction protrusion 413*a* may be provided on the first guide protrusion 413 so that the frictional force between the hinge bracket 401 and the rotation member 402*a* or 402*b* may be controlled. While not shown, the sub-inclined surface IF2 of the cam member 403 may be omitted, and a structure similar to this friction protrusion 413*a* may be provided on the cam member 403 to contact the main inclined surface IF1. In another embodiment, the cam member 403 may include the sub-inclined surface IF2 and a protrusion similar to the friction protrusion 413*a* may be formed on the sub-inclined surface IF2, to adjust the area of contact between the cam member 403 and the rotation body 421.

Figure 22:
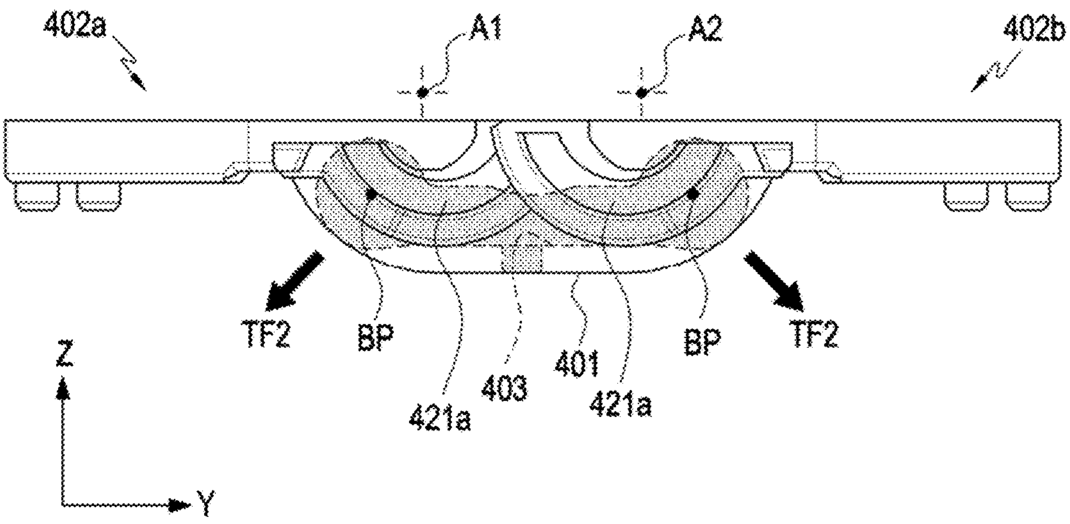
FIG. 22 is a diagram illustrating a hinge module in the unfolded state according to an embodiment of the disclosure.
Figure 23:
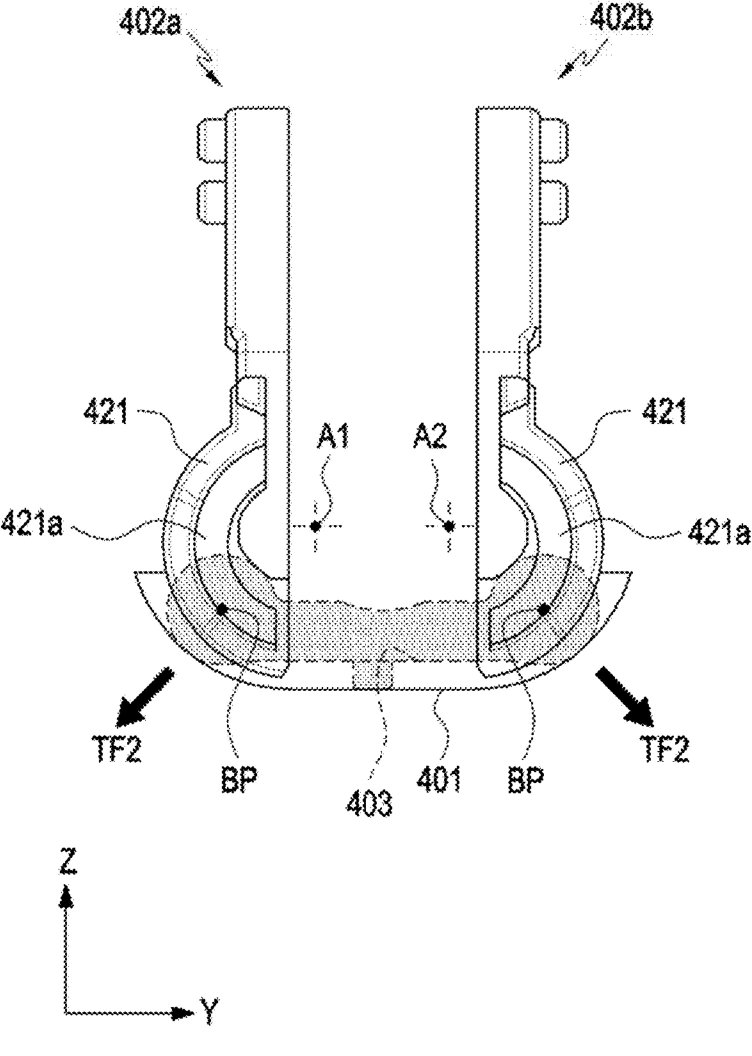
FIG. 23 is a diagram illustrating a hinge module in the folded state according to an embodiment of the disclosure.

FIG. 22 is a diagram illustrating a hinge module (e.g., the hinge module 400*a* of FIG. 4) in the unfolded state according to an embodiment of the disclosure. FIG. 23 is a diagram illustrating the hinge module 400*a* in the folded state according to an embodiment of the disclosure.

FIGS. 22 and 23 illustrate an example of actual contact point(s) (e.g., pressing point(s) BP) between the cam member 403 (e.g., the pressing protrusion 431*b*) and the rotation body 421 (e.g., the contact area 421*c* of FIG. 10), and the resultant conversion of an elastic force, in which the pressing point BP on the hinge bracket 401 may be maintained substantially constant regardless of a rotational position of the rotation member 402*a* or 402*b*. In an embodiment, a main inclined surface (e.g., the main inclined surface IF1 of FIG. 21) may be provided on most of the contact area 421*c*, and part of the elastic force of the elastic member 441 may be converted in the arrowed direction TF2. In an embodiment, when the rotation body 421 is cut in the radial direction of the arc trajectory, the main inclined surface IF1 may be inclined closer to the elastic member 441 or the cam member 403 as it is farther from the folding axis A1 or A2, as described with reference to FIG. 12. For example, the arrowed direction TF2 in which part of the elastic force is converted and actually applied may be substantially the radial direction of the trajectory of the contact area 421*c* (or the guide groove 421*a*) or a straight direction passing through the folding axis A1 or A2 and the pressing point BP, and also a direction in which the rotation body 421 is brought into contact with the guide curved surface 411.

FIGS. 24 to 27 are diagrams illustrating modified example(s) of a hinge module (e.g., the hinge module 400*a* of FIG. 4) according to an embodiment of the disclosure.

Figure 24:
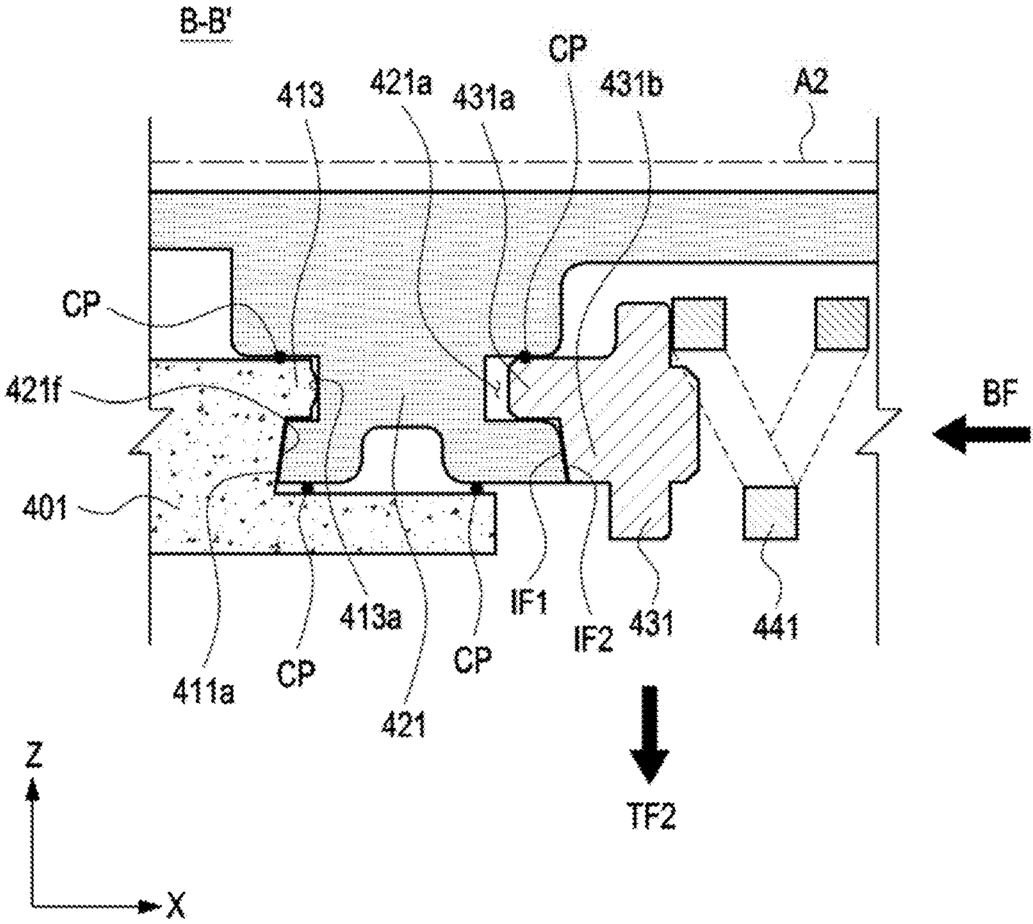
FIGS. 24 to 27 are diagrams illustrating modified example(s) of a hinge module according to an embodiment of the disclosure.
Figure 25:
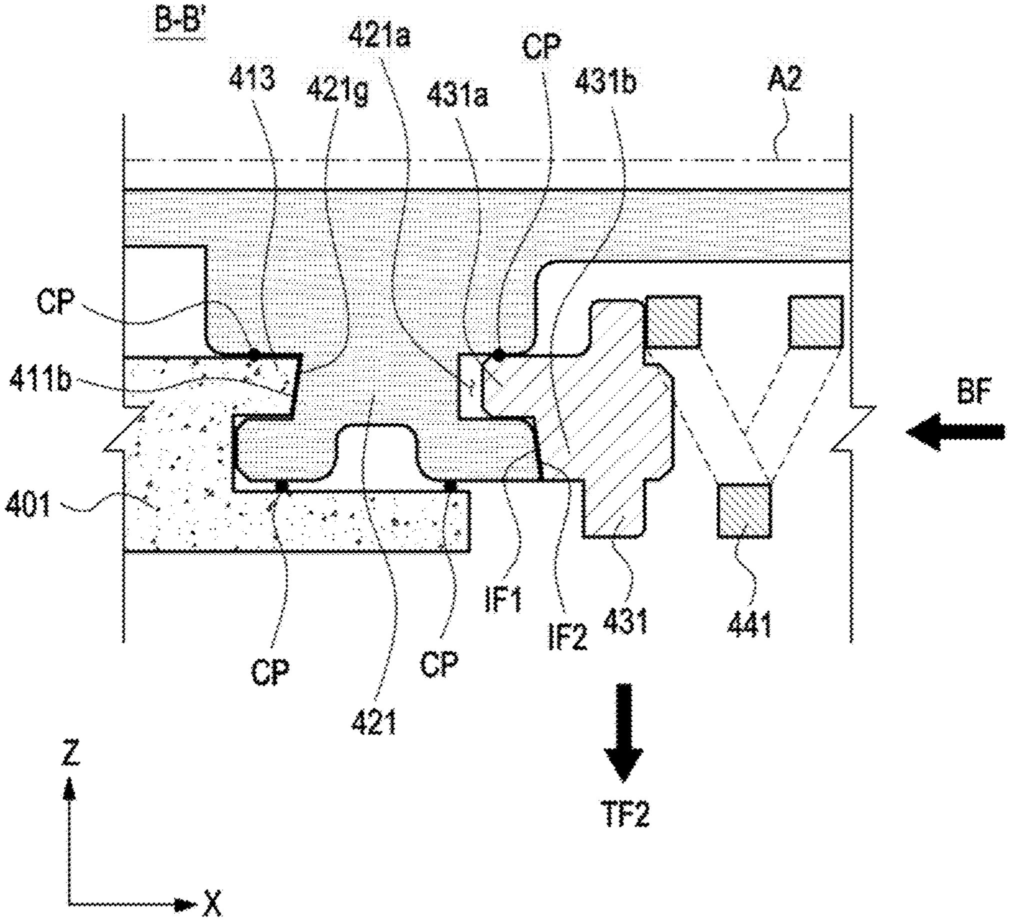
Figure 26:
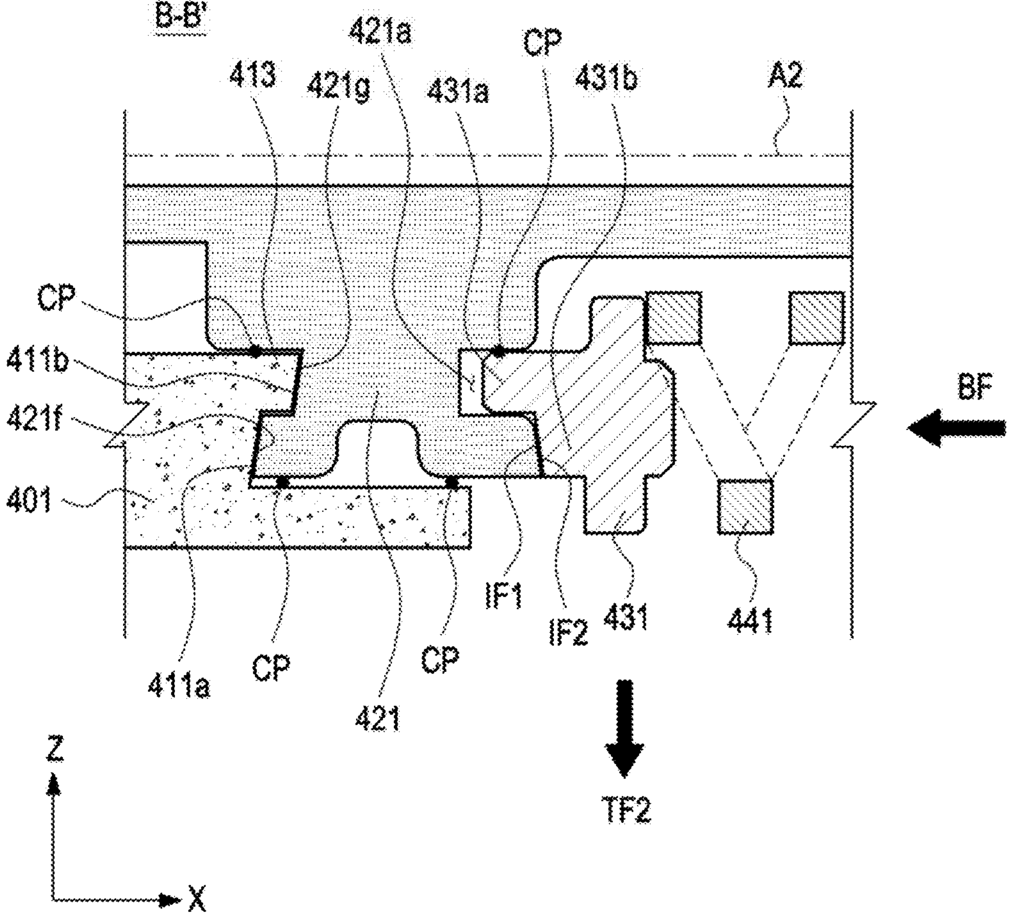

According to an embodiment, the other surface of the rotation body 421 may be brought into contact or close contact with an inner wall (e.g., the inner wall on which the first guide protrusion 413 is disposed) of the hinge bracket 401 by the elastic force of the elastic member 441. The first guide protrusion 413 may be provided on the inner wall of the hinge bracket 401 at a position spaced apart from the guide curved surface 411 and accommodated in the first guide groove 421*d* of the rotation body 421, thereby guiding or supporting rotation of the rotation member 402*a* or 402*b*. Referring to FIGS. 24 to 26, as at least one inclined surface 411*a* and 411*b* is provided on the inner wall of the hinge bracket 401 or the end surface of the first guide protrusion 413, and at least one other inclined surface 421*f* and 421*g* corresponding thereto is provided on the other surface of the rotation body 421, part of the elastic force of the elastic member 441 may be converted. The force converted by the inclined surfaces 411*a*, 411*b*, 421*f*, and 421*g* may fix point(s) (e.g., the contact point(s) CP of FIG. 20) where the rotation body 421 contacts on the hinge bracket 401 substantially at a specified position. The inclined surfaces 411*a* and 411*b* of the hinge bracket 401 may be disposed at least partially between the inclined surfaces 421*f* and 421*g* of the rotation body 421 and the folding axes A1 and A2, and press or closely contact the inclined surfaces 421*f* and 421*g* of the rotation body 421.

Figure 27:
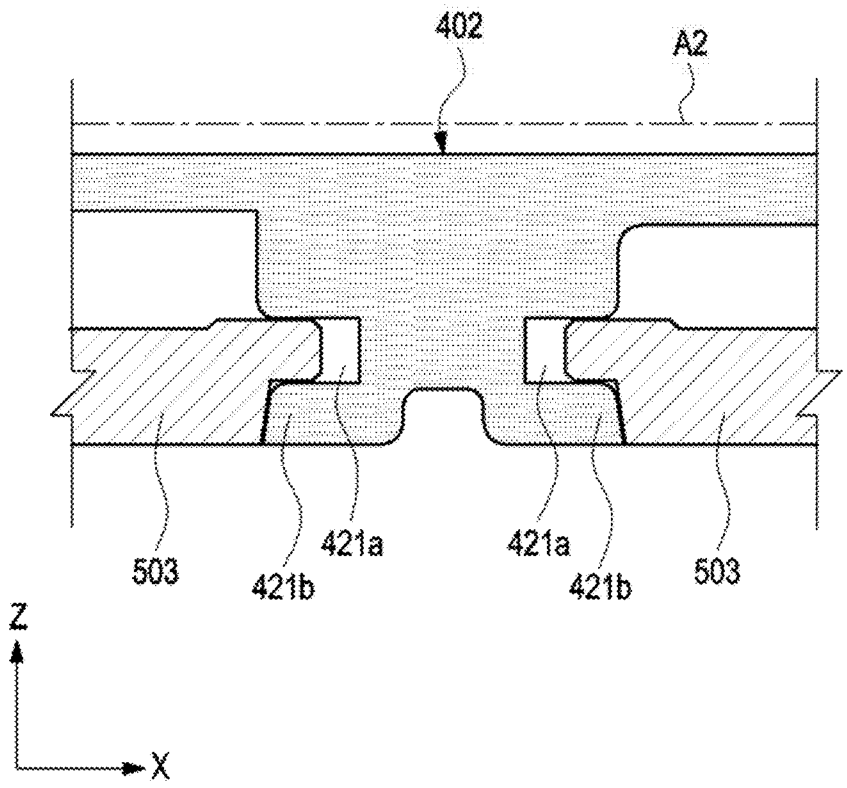

Referring to FIG. 27, a pair of cams 503 may be provided to face both surfaces of the rotation body 421. For example, the guide groove 421*a* and the detent protrusion 421*b* may be provided on each of both surfaces of the rotation body 421, and the cams 503 provided with the guide protrusion 431*a* and the pressing protrusion 431*b* of FIG. 13 may be disposed to face each other with the rotation body 421 interposed therebetween in the direction of the folding axis A1 or A2.

Figure 28:
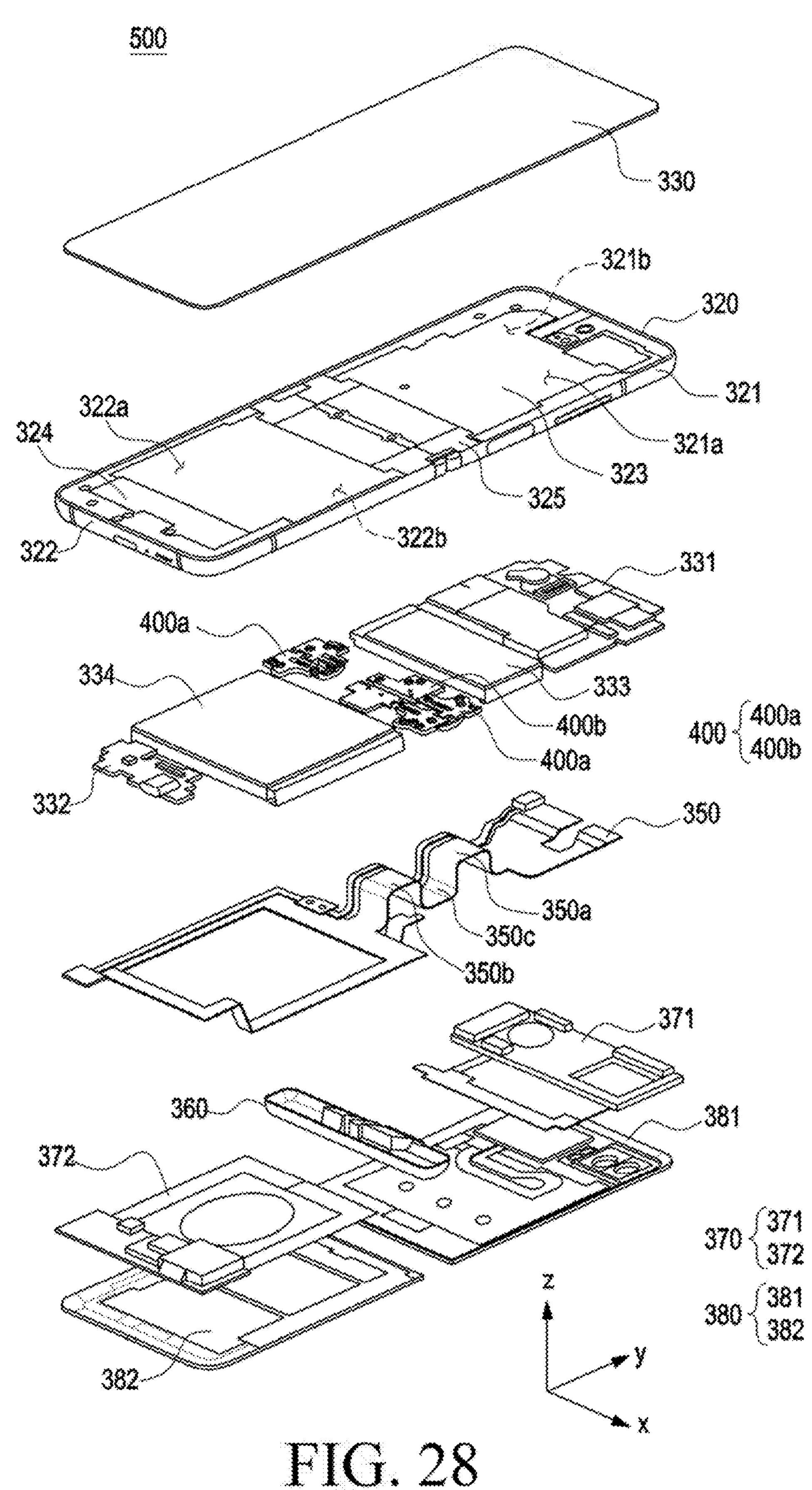
FIG. 28 is an exploded perspective view illustrating an electronic device according to an embodiment of the disclosure.

FIG. 28 is an exploded perspective view of an electronic device 500 (e.g., the electronic device 101, 200, or 300 of FIGS. 1 to 3 or FIG. 7) according to an embodiment of the disclosure.

The electronic device 500 illustrated in FIG. 28 may include the hinge structure 400 of FIG. 4. For example, the electronic device 500 illustrated in FIG. 28 may be implemented by replacing the hinge structure 340 in the electronic device 300 of FIG. 3 with the hinge structure 400 of FIG. 4. In describing the embodiment (e.g., the electronic device 500) illustrated in FIG. 28, the electronic device 300 of FIG. 3 and/or the hinge structure 400 of FIG. 4 may be referred to, and components similar to or substantially the same as those in the electronic device of FIG. 300 and/or the hinge structure 400 of FIG. 4 may be given the same reference numerals or omitted, and their detailed description may also be omitted.

Referring to FIG. 28, the hinge structure 400 may include a pair of hinge modules 400*a* and an interlocking hinge module 400*b* disposed between the hinge modules 400*a*. For example, the hinge modules 400*a* and the interlocking hinge module 400*b* may be aligned along the direction of a folding axis (e.g., the folding axis(es) A, A1, or/and A2 of FIG. 1 or 5). In an embodiment, when a pair of hinge modules 400*a* are provided, the hinge modules 400*a* may be disposed adjacent the peripheries of the housings 321 and 322 on the folding axis(es) A, A1 or/and A2.

According to an embodiment, the rotation members 402*a* and 402*b* of the hinge module 400*a* may be disposed or coupled on the different second and fourth surfaces 321*b* and 322*b* of the housings 321 and 322. For example, the housings 321 and 322 may rotate or pivot with respect to the hinge structure 400 according to rotation of the rotation members 402*a* and 402*b*. In the unfolded state, the rotation members 402*a* and 402*b* may be disposed side by side each on one side of the other rotation member, and substantially face each other in the folded state. In an embodiment, part of the bracket assembly(es) 323 or/and 324 (*s*) and/or part of the display 330 may be disposed between the rotation members 402*a* and 402*b* in the folded state. In an embodiment, the rotation members 402*a* and 402*b* may be integrally formed with the different bracket assemblies 323 and 324. For example, although an example in which the rotation members 402*a* and 402*b* are structures separate from the bracket assemblies 323 and 324 is described, the disclosure is not limited thereto and the rotation members 402*a* and 402*b* may be implemented as part of the bracket assemblies 323 and 324 according to an embodiment.

In the above-described embodiment, while a 'rotation member' is generally described with reference to the second rotation member 402*b*, those skilled in the art will easily understand that the first rotation member 402*a* is similar to or substantially the same as the second rotation member 402*b* except for some differences in a relative position and the resulting force application direction (e.g., the conversion direction of the elastic force). For example, the configuration of the first rotation member 402*a* may be easily understood from the above-described embodiment(s) illustrating the second rotation member 402*b*. In various embodiments, the foldable housing 210 and 220 or 321 and 322 or the rotation members 402*a* and 402*b* may rotate in opposite directions relative to each other by an interlocking hinge module (e.g., the interlocking hinge module 400*b* of FIG. 4). Although not directly disclosed, an interlocking structure using a slider (e.g., the slider 407 of FIG. 4) may be replaced with a structure in which a plurality of gears are combined.

According to an embodiment of the disclosure, the contact point of the rotating member(s) on the hinge bracket may be substantially fixed with respect to the folding axis(s). For example, relative displacement other than rotation (or pivoting) of the housing(s) and/or the rotating member(s) according to a folding or unfolding operation of the electronic device on the hinge bracket may be suppressed. Therefore, a stable coupling structure or rotation structure may be maintained despite manufacturing tolerances or repeated deformation operations. In an embodiment, as relative displacement unintended in a design or manufacturing process is suppressed, the hinge module and/or the electronic device including the same according to an embodiment of the disclosure may improve user satisfaction while providing improved emotional quality. In addition, various effects identified directly or indirectly through this document may be provided.

According to an embodiment of the disclosure, an electronic device (e.g., the electronic devices 101, 200, and 300 of FIGS. 1 to 3) may include a first housing (e.g., the first housing 210 or 321 of FIG. 2 or 3), a second housing (e.g., the second housing 220 or 322 of FIG. 2 or 3) configured to pivot between a position (hereinafter, a 'first position') at which the second housing is folded to face the first housing and a position (hereinafter, a 'second position) at which the second housing is unfolded at a specified angle from the first housing, a display (e.g., the display 230 or 330 of FIG. 2 or 3) including a first area (e.g., the first area 231*a* of FIG. 2) disposed on the first housing, a second area (e.g., the second area 231*b* of FIG. 2) disposed on the second housing, and a folding area (e.g., the folding area 231*c* of FIG. 2) disposed between the first area and the second area, and at least one hinge module (e.g., the hinge structure 340 of FIG. 3 or the hinge module 400*a* of FIG. 4) disposed between the first housing and the second housing and pivotably connecting the first housing and the second housing to each other. The hinge module may include a hinge bracket (e.g., the hinge bracket 401 of FIG. 4), a first rotation member (e.g., the first rotation member 402*a* of FIG. 4 or 5) coupled with the first housing and disposed on the hinge bracket pivotably or rotatably around a first folding axis (e.g., the folding axis A of FIG. 2 or the first folding axis A1 of FIG. 5), a second rotation member (e.g., the second rotation member 402*b* of FIG. 4 or 5) coupled with the second housing and disposed on the hinge bracket pivotably or rotatably around a second folding axis (e.g., the folding axis A of FIG. 2 or the second folding axis A2 of FIG. 5), a cam member (e.g., the cam member 403 of FIG. 4 or 6) disposed on the hinge bracket, facing at least part of the first rotation member and the second rotation member, and an elastic member (e.g., the elastic member 441 of FIG. 4 or 6) providing an elastic force to the cam member in a first action direction (e.g., a direction substantially parallel to the folding axis A2 of FIG. 21). The cam member may be configured to at least partially contact an inclined surface (e.g., the main inclined surface IF1 of FIG. 12) of the first rotation member or an inclined surface (e.g., the main inclined surface IF1 of FIG. 12) of the second rotation member by receiving the elastic force of the elastic member.

According to an embodiment, the elastic member may be configured to press the first rotation member and the second rotation member in a second action direction (e.g., the arrowed direction TF2 of FIG. 22 or 23) crossing the first action direction, based on the elastic force of the elastic member.

According to an embodiment, the elastic member may be configured to provide the elastic force to the cam member in a direction parallel to the first folding axis or the second folding axis, and the cam member may be configured to press at least part of the first rotation member in a direction receding from the first folding axis or at least part of the second rotation member in a direction receding from the second folding axis.

According to an embodiment, the hinge module may further include a first contact area (e.g., the contact area 421*c* of FIG. 9 or 10) of an arc trajectory centering on the first folding axis as an area formed on the first rotation member and contacting the cam member, and a second contact area (e.g., the contact area 421*c* of FIG. 9 or 10) of an arc trajectory centering on the second folding axis as an area formed on the second rotation member and contacting the cam member, and the first contact area or the second contact area may be formed to be at least partially inclined with respect to the first folding axis or the second folding axis (e.g., by the specified angle IA of FIG. 12).

According to an embodiment, the cam member may be configured to convert the elastic force of the elastic member in a direction in which the first contact area recedes from the first folding axis or a direction in which the second contact area recedes from the second folding axis by pressing the first rotation member or the second rotation member at least at the first position in a pivoting angular range of the second housing.

According to an embodiment, the first contact area or the second contact area may be formed to be inclined in a direction approaching the cam member or the elastic member, as the first contact area or the second contact area recedes from the first folding axis or the second folding axis in a radial direction of the arc trajectory, and the cam member may be configured to slidingly contact the first contact area or the second contact area.

According to an embodiment, the hinge module may include at least one pressing protrusion (e.g., the pressing protrusion 431*b* of FIG. 13) protruding from one surface of the cam member, and an inclined surface (e.g., the sub-inclined surface IF2 of FIG. 16 or 21) slidingly contacting the first contact area or the second contact area, as part of a surface of the pressing protrusion.

According to an embodiment, the hinge module may further include at least one detent protrusion (e.g., the detent protrusion 421*b* of FIG. 9) formed in the first contact area or the second contact area, and the pressing protrusion may at least partially contact the detent protrusion at the first position in a pivoting angular range of the second housing.

According to an embodiment, the hinge module may further include guide grooves (e.g., the guide groove 421*a* of FIG. 9) formed in the first rotation member and the second rotation member, respectively and having arc trajectories centering on any one of the first folding axis and the second folding axis, and guide protrusions (e.g., the guide protrusions 431*a* of FIG. 13) formed on one surface of the cam member, each being accommodated in any one of the guide grooves, and the first rotation member and the second rotation member may be configured to pivot or rotate on the hinge bracket under guidance of the guide grooves and the guide protrusions.

According to an embodiment, the hinge module may further include contact areas formed in the first rotation member and the second rotation member, respectively and extending from peripheries of the guide grooves in arc trajectories centering on any one of the first folding axis and the second folding axis, and pressing protrusions protruding from one surface of the cam member, each being configured to slidingly contact any one of the contact areas according to rotation of the first rotation member and the second rotation member. The contact areas may be formed to be at least partially inclined with respect to the first folding axis or the second folding axis.

According to an embodiment, the electronic device and/or the hinge module may include a slide bracket (e.g., the slide bracket 405 of FIG. 4) extending along a direction of the first folding axis or the second folding axis, a pair of third rotation members (e.g., the third rotation members 406*a* and 406*b* of FIG. 4) each coupled with any one of the first housing and the second housing, disposed on the slide bracket pivotably or rotatably around any one of the first folding axis and the second folding axis, and including a slide protrusion (e.g., the slide protrusion 461 of FIG. 4) moving in an arc trajectory on the slide bracket, and a slider disposed to be linearly movable along the direction of the first folding axis or the second folding axis on the slide bracket, extending along an inclined curved trajectory, and including slide holes each accommodating any one of the slide protrusions. The slider may be configured to, according to pivoting of any one of the third rotation members, pivot another one of the third rotation members, while linearly moving on the slide bracket.

According to an embodiment, the slide bracket may extend from the hinge bracket.

According to an embodiment, the hinge module may include at least one guide curved surface (e.g., the guide curved surface 411 of FIG. 4 or 8) formed on an inner surface of the hinge bracket and guiding rotation of the first rotation member and the second rotation member, first guide protrusions (e.g., the first guide protrusions 413 of FIG. 9) disposed inside the guide curved surface and extending in a direction of the first folding axis or the second folding axis, and first guide grooves (the first guide grooves 421*d* of FIG. 12) formed in the first rotation member and the second rotation member, respectively and having arc trajectories centering on any one of the first folding axis and the second folding axis, and as the first guide protrusions are movably accommodated in the first guide grooves, the first guide protrusions may fasten the first rotation member and the second rotation member rotatably on the hinge bracket.

According to an embodiment, the electronic device and/or the hinge module may further include a first inclined surface (e.g., the inclined surface indicated by '421*g*' in FIG. 25 or 26) forming part of the first guide groove, and a second inclined surface (e.g., the inclined surface indicated by '411*b*' in FIG. 25 or 26) forming part of a surface of the first guide protrusion and at least partially contacting the first inclined surface. The second inclined surface may be disposed at least partially between the first inclined surface and the first folding axis or between the first inclined surface and the second folding axis.

According to an embodiment, at least part of the first inclined surface and at least part of the second inclined surface may be configured to be brought into close contact with each other by the elastic force of the elastic member.

According to an embodiment of the disclosure, a hinge module (e.g., the hinge structure 340 of FIG. 3 or the hinge module 400*a* of FIG. 4) configured to pivotably couple a first housing (e.g., the first housing 210 or 321 of FIG. 2 or 3) and a second housing (e.g., the second housing 220 or 322 of FIG. 2 or 3) of an electronic device (e.g., the electronic devices 101, 200, and 300 of FIGS. 1 to 3) with each other may include a hinge bracket (e.g., the hinge bracket 401 of FIG. 4), a first rotation member (e.g., the first rotation member 402*a* of FIG. 4 or 5) coupled with the first housing and disposed on the hinge bracket pivotably or rotatably around a first folding axis (e.g., the folding axis A or the first folding axis A1 of FIG. 5), a second rotation member (e.g., the second rotation member 402*b* of FIG. 4 or 5) coupled with the second housing and disposed on the hinge bracket pivotably or rotatably around a second folding axis (e.g., the folding axis A or the second folding axis A2 of FIG. 5), a cam member (e.g., the cam member 403 of FIG. 4 or 6) disposed on the hinge bracket to be linearly movable, facing at least part of the first rotation member and the second rotation member, and an elastic member (e.g., the elastic member 441 of FIG. 4 or 6) providing an elastic force to the cam member in a direction in which the first rotation member and the second rotation member are brought into close contact with each other. Each of the first rotation member and the second rotation member may include an inclined surface (e.g., the main inclined surface IF1 of FIG. 16 or 21) contacting the cam member, and the cam member may be configured to press at least part of the first rotation member in a direction crossing the first folding axis or at least part of the second rotation member in a direction crossing the second folding axis based on the elastic force of the elastic member.

According to an embodiment, the cam member may at least partially contact the inclined surfaces between the inclined surface of the first rotation member and the first folding axis or between the inclined surface of the second rotation member and the second folding axis.

According to an embodiment, the hinge module may further include a first contact area (e.g., the contact area 421*c* of FIG. 9 or 10) of an arc trajectory centering on the first folding axis as an area formed on the first rotation member and contacting the cam member, and a second contact area (e.g., the contact area 421*c* of FIG. 9 or 10) of an arc trajectory centering on the second folding axis as an area formed on the second rotation member and contacting the cam member, and the inclined surface may be disposed in at least part of the first contact area or the second contact area.

According to an embodiment, the first contact area or the second contact area may be formed in an arc trajectory equal to or greater than 90 degrees and equal to or less than 100 degrees.

According to an embodiment, the hinge module may further include guide grooves (e.g., the guide grooves 421*a* of FIG. 9) formed in the first rotation member and the second rotation member, respectively and having arc trajectories centering on any one of the first folding axis and the second folding axis, guide protrusions (e.g., the guide protrusions 431*a* of FIG. 13) guiding pivoting or rotation of the first rotation member and the second rotation member by each being formed on one surface of the cam member and accommodated in any one of the guide grooves, contact areas formed in the first rotation member and the second rotation member, respectively and extending from peripheries of the guide grooves in arc trajectories centering on any one of the first folding axis and the second folding axis, and pressing protrusions (e.g., the pressing protrusions 431*b* of FIG. 13) protruding from one surface of the cam member, each being configured to slidingly contact any one of the contact areas according to rotation of the first rotation member and the second rotation member. The contact areas may at least partially include the inclined surfaces.

According to an embodiment, as the first rotation member and the second rotation member rotate, the pressing protrusions may be configured to be positioned between the first folding axis and the inclined surface of any one of the contact areas or between the second folding axis and the inclined surface of another one of the contact areas.

According to an embodiment, the electronic device may not comprise a display. For example, the electronic device may comprise a foldable keyboard or any other electronic device not comprising a display.

While various embodiments of the disclosure have been described by way of example, it is to be understood that the various embodiments are for illustrate purposes, not intended to limit the disclosure. It will be apparent to those skilled in the art that various changes can be made in the form and specific configurations without departing from the whole perspective of the disclosure inclusive of the appended claims and their equivalents. For example, an additional embodiment may be implemented by selectively combining component(s) of the afore-described different embodiments.

It will be appreciated that the above-described embodiments, and their technical features, may be combined with one another in each and every combination, potentially unless there is a conflict between two embodiments or features. That is, each and every combination of two or more of the above-described embodiments is envisaged and included within the present disclosure. One or more features from any embodiment may be incorporated in any other embodiment, and provide a corresponding advantage or advantages.

What is claimed is:

1. An electronic device comprising:

a first housing;

a second housing configured to pivot between a first position at which the second housing is folded to face the first housing and a second position at which the second housing is unfolded at a specified angle from the first housing;

a display including a first area disposed on the first housing, a second area disposed on the second housing, and a folding area disposed between the first area and the second area; and at least one hinge module disposed between the first housing and the second housing and pivotably connecting the first housing and the second housing to each other, wherein the hinge module comprises:

a hinge bracket;

a first rotation member coupled with the first housing and disposed on the hinge bracket pivotably or rotatably around a first folding axis;

a second rotation member coupled with the second housing and disposed on the hinge bracket pivotably or rotatably around a second folding axis;

a cam member disposed on the hinge bracket, facing at least part of the first rotation member and the second rotation member; and an elastic member configured to provide an elastic force to the cam member in a first action direction, and wherein, when the cam member receives the elastic force provided by the elastic member, the cam member is configured to at least partially contact an inclined surface of the first rotation member or an inclined surface of the second rotation member.

2. The electronic device of claim 1, wherein the elastic member is configured to provide the elastic force to the cam member in a direction parallel to the first folding axis or the second folding axis, and wherein the cam member is configured to press at least part of the first rotation member in a direction receding from the first folding axis or at least part of the second rotation member in a direction receding from the second folding axis.

3. The electronic device of claim 1, wherein the hinge module further comprises:

a first contact area of an arc trajectory centering on the first folding axis as an area formed on the first rotation member and configured to contact the cam member; and a second contact area of an arc trajectory centering on the second folding axis as an area formed on the second rotation member and configured to contact the cam member, and wherein the first contact area or the second contact area is formed to be at least partially inclined with respect to the first folding axis or the second folding axis respectively.

4. The electronic device of claim 3, wherein the cam member is configured to convert the elastic force of the elastic member in a direction in which the first contact area recedes from the first folding axis or a direction in which the second contact area recedes from the second folding axis by pressing the first rotation member or the second rotation member at least at the first position in a pivoting angular range of the second housing.

5. The electronic device of claim 3, wherein the first contact area or the second contact area is formed to be inclined in a direction approaching the cam member or the elastic member, as the first contact area or the second contact area recedes from the first folding axis or the second folding axis in a radial direction of the arc trajectory, and wherein the cam member is configured to slidingly contact the first contact area or the second contact area.

6. The electronic device of claim 3, wherein the hinge module further comprises:

at least one pressing protrusion protruding from one surface of the cam member; and an inclined surface slidingly contacting the first contact area or the second contact area, as part of a surface of the pressing protrusion;

and optionally, wherein the hinge module further comprises at least one detent protrusion formed in the first contact area or the second contact area, and wherein one of the at least one pressing protrusions at least partially contacts one of the at least one detent protrusions at the first position in a pivoting angular range of the second housing.

7. The electronic device claim 1, wherein the hinge module further comprises:

at least one guide groove formed in each of the first rotation member and the second rotation member and having arc trajectories centering on any one of the first folding axis and the second folding axis; and at least one guide protrusion formed on one surface of the cam member, each of the at least one guide protrusion being accommodated in any one of the at least one guide groove, and wherein the first rotation member and the second rotation member are configured to pivot or rotate on the hinge bracket under guidance of the at least one guide groove and the at least one guide protrusion.

8. The electronic device of claim 7, wherein the hinge module further comprises:

at least one contact area formed in each of the first rotation member and the second rotation member and extending from peripheries of the guide grooves in arc trajectories centering on any one of the first folding axis and the second folding axis; and at least one pressing protrusion protruding from one surface of the cam member, each of the at least one pressing protrusions being configured to slidingly contact any one of the at least one contact areas upon rotation of the first rotation member and the second rotation member, and wherein the at least one contact areas are formed to be at least partially inclined with respect to the first folding axis or the second folding axis.

9. The electronic device of claim 1, further comprising:

a slide bracket extending along a direction of the first folding axis or the second folding axis;

a pair of third rotation members each coupled with any one of the first housing and the second housing, disposed on the slide bracket pivotably or rotatably around any one of the first folding axis and the second folding axis, and each third rotation member including a slide protrusion configured to move in an arc trajectory on the slide bracket; and a slider disposed to be linearly movable along the direction of the first folding axis or the second folding axis on the slide bracket, extending along an inclined curved trajectory, and including a plurality of slide holes each configured to accommodate any one of the slide protrusions of the third rotation members, wherein the slider is configured to, according to pivoting of any one of the third rotation members, pivot another one of the third rotation members, while linearly moving on the slide bracket; and optionally, wherein the slide bracket extends from the hinge bracket.

10. The electronic device of claim 1, wherein the hinge module further comprises:

at least one guide curved surface formed on an inner surface of the hinge bracket and configured to guide rotation of the first rotation member and the second rotation member;

at least one first guide protrusion disposed inside the guide curved surface and extending in a direction of the first folding axis or the second folding axis; and at least one first guide groove formed in the first rotation member and the second rotation member, and having arc trajectories centering on any one of the first folding axis and the second folding axis, and wherein as the at least one first guide protrusion is movably accommodated in the at least one first guide groove, the at least one first guide protrusion fastens the first rotation member and the second rotation member rotatably on the hinge bracket.

11. The electronic device of claim 10, further comprising:
a first inclined surface forming part of the at least one first guide groove; and
a second inclined surface forming part of a surface of the at least one first guide protrusion and at least partially contacting the first inclined surface,
wherein the second inclined surface is disposed at least partially between the first inclined surface and the first folding axis or between the first inclined surface and the second folding axis; and
optionally, wherein at least part of the first inclined surface and at least part of the second inclined surface are configured to be brought into close contact with each other by the elastic force of the elastic member.

12. A hinge module configured to pivotably couple a first housing and a second housing of an electronic device with each other, the hinge module comprising: a hinge bracket;
a first rotation member coupled with the first housing and disposed on the hinge bracket pivotably or rotatably around a first folding axis;
a second rotation member coupled with the second housing and disposed on the hinge bracket pivotably or rotatably around a second folding axis;
a cam member disposed on the hinge bracket to be linearly movable, facing at least part of the first rotation member and at least part of the second rotation member; and
an elastic member configured to provide an elastic force to the cam member in a direction in which the cam member is brought into contact with at least one of the first rotation member and the second rotation member,
wherein each of the first rotation member and the second rotation member includes an inclined surface configured to contact the cam member, and
wherein, when the cam member receives the elastic force provided by the elastic member, the cam member is configured to press at least part of the first rotation member in a direction crossing the first folding axis or at least part of the second rotation member in a direction crossing the second folding axis.

13. The hinge module of claim 12, wherein the cam member is configured to at least partially contact the inclined surfaces between the inclined surface of the first rotation member and the first folding axis or between the inclined surface of the second rotation member and the second folding axis.

14. The hinge module of claim 12, further comprising:
a first contact area of an arc trajectory centering on the first folding axis as an area formed on the first rotation member and contacting the cam member; and
a second contact area of an arc trajectory centering on the second folding axis as an area formed on the second rotation member and contacting the cam member, and
wherein the inclined surface is disposed in at least part of the first contact area or the second contact area; and
optionally, wherein the first contact area or the second contact area is formed in an arc trajectory equal to or greater than 90 degrees and equal to or less than 100 degrees.

15. The hinge module of claim 12, further comprising:
at least one guide groove formed in each of the first rotation member and the second rotation member and wherein each of the at least one guide groove have an arc trajectory centering on any one of the first folding axis and the second folding axis;
at least one guide protrusion configured to guide pivoting or rotation of the first rotation member and the second rotation member by each being formed on one surface of the cam member and accommodated in any one of the at least one guide groove;
at least one contact area formed in the first rotation member and the second rotation member, respectively and extending from peripheries of the at least one guide groove in an arc trajectory centering on any one of the first folding axis and the second folding axis; and
at least one pressing protrusion protruding from one surface of the cam member, each being configured to slidingly contact any one of the at least one contact area according to rotation of the first rotation member and the second rotation member, and
wherein the at least one contact area at least partially include the inclined surfaces; and
optionally, wherein as the first rotation member and the second rotation member rotate, the at least one pressing protrusion are configured to be positioned between the first folding axis and the inclined surface of any one of the at least one contact area or between the second folding axis and the inclined surface of another one of the at least one contact area.

* * * * *